(12) United States Patent
Nakahara et al.

(10) Patent No.: US 7,725,399 B2
(45) Date of Patent: May 25, 2010

(54) CONTENT USAGE DEVICE AND NETWORK SYSTEM, AND LICENSE INFORMATION ACQUISITION METHOD

(75) Inventors: Tohru Nakahara, Osaka (JP); Masanori Nakanishi, Osaka (JP); Yasushi Uesaka, Sanda (JP); Kouji Miura, Matsubara (JP); Akio Higashi, Takatsuki (JP); Takaaki Namba, Nagoya (JP)

(73) Assignee: Panasonic Corporation, Osaka (JP)

( * ) Notice: Subject to any disclaimer, the term of this patent is extended or adjusted under 35 U.S.C. 154(b) by 2083 days.

(21) Appl. No.: 10/195,108

(22) Filed: Jul. 15, 2002

(65) Prior Publication Data
US 2003/0018491 A1 Jan. 23, 2003

(30) Foreign Application Priority Data
Jul. 17, 2001 (JP) ............................ 2001-216341
Feb. 28, 2002 (JP) ............................ 2002-054761

(51) Int. Cl.
G06F 21/00 (2006.01)

(52) U.S. Cl. ............................ 705/57; 705/40; 705/51; 705/59; 705/64; 380/49; 380/239

(58) Field of Classification Search .................. 705/57, 705/59, 23, 40, 51, 64; 380/49, 239
See application file for complete search history.

(56) References Cited

U.S. PATENT DOCUMENTS

| | | | |
|---|---|---|---|
| 5,390,297 A | | 2/1995 | Barber et al. |
| 5,671,412 A | * | 9/1997 | Christiano ............... 707/104.1 |
| 5,794,207 A | * | 8/1998 | Walker et al. ................. 705/1 |
| 5,910,987 A | * | 6/1999 | Ginter et al. .................. 705/52 |
| 5,949,876 A | | 9/1999 | Ginter et al. |
| 6,226,618 B1 | * | 5/2001 | Downs et al. .................. 705/1 |
| 6,772,133 B1 | * | 8/2004 | Kambayashi et al. .......... 705/57 |
| 6,834,110 B1 | * | 12/2004 | Marconcini et al. ......... 380/239 |
| 6,873,975 B1 | * | 3/2005 | Hatakeyama et al. ......... 705/51 |
| 7,080,042 B2 | * | 7/2006 | Koike et al. ................... 705/52 |
| 7,099,479 B1 | | 8/2006 | Ishibashi et al. |
| 7,277,870 B2 | * | 10/2007 | Mourad et al. ................ 705/51 |
| 2006/0168451 A1 | | 7/2006 | Ishibashi et al. |
| 2007/0030974 A1 | | 2/2007 | Ishibashi et al. |

FOREIGN PATENT DOCUMENTS

| | | |
|---|---|---|
| EP | 1 079 628 | 2/2001 |
| EP | 1 107 137 | 6/2001 |

(Continued)

*Primary Examiner*—Pierre E Elisca
*Assistant Examiner*—Shahid Kamal
(74) *Attorney, Agent, or Firm*—Wenderoth, Lind & Ponack, L.L.P.

(57) ABSTRACT

A content usage device includes (i) a license management unit that holds license information and (ii) a content output unit that uses a content in compliance with license information and outputs the content in at least one manner of a sound, video and data. The license management unit, upon receiving a request of license information from the content output unit, requests a license management unit of another content usage device to transfer the license information and acquires the license information, and passes the acquired license information to the content output unit. The content output unit uses a content in compliance with the license information passed from the license management unit.

13 Claims, 22 Drawing Sheets

FOREIGN PATENT DOCUMENTS

| | | |
|---|---|---|
| EP | 1 134 670 | 9/2001 |
| JP | 6-500878 | 1/1994 |
| JP | 11-203125 | 7/1999 |
| JP | 2000-048076 | 2/2000 |
| JP | 2000-293439 | 10/2000 |
| JP | 2001-273134 | 10/2001 |
| JP | 2003-242032 | 8/2003 |
| WO | 92/20021 | 11/1992 |
| WO | 01/04727 | 1/2001 |
| WO | 01/06469 | 1/2001 |
| WO | 01/16776 | 3/2001 |

* cited by examiner

CONTENT USAGE DEVICE AND NETWORK SYSTEM, AND LICENSE INFORMATION ACQUISITION METHOD

BACKGROUND OF THE INVENTION

1. Field of the Invention

The present invention relates to a content usage device and a network system, and a license information acquisition method for using a content which is a digital work such as music and video using license information distributed from a server, and further relates to a technology for effective use of license information.

2. Description of the Related Art

In recent years, systems that distribute contents, via the Internet or digital broadcasting, that are digital works such as music, video and games have been developed, and a part of them is now in a phase for practical use. For distributing these contents, the methodology of content usage control, which restricts the number of reproduction (play/playback) times, moving and copying of the distributed content, has also been examined from a viewpoint of copyright protection, etc.

The conventional systems, as disclosed in the Japanese Laid-Open Patent Application Nos. 2000-48076 and 2000-293439, have been modeled so that (i) a server distributes information (hereinafter referred to as "license information") that is necessary for content usage and restricts a content usage rule, and (ii) a plurality of content usage devices on a network system at home (home network) use the content using the license information distributed from the server so as to reproduce it.

Also, the license information distributed from the server is held by individual content usage device, and the content usage device uses the content using the license information held by the content usage device itself.

However, according to the conventional content usage device and network system, only the content usage device that requests the server to distribute the license information can receive the license information and use it. That is, the content usage device cannot use the content using the license information distributed from the server if it does not hold the license information in itself, even if the other content usage device holds that license information. That is a problem.

Accordingly, the object of the present invention is, in consideration of the above problem, to provide a content usage device and a network system, and a license information acquisition method for effectively using license information distributed from a server.

BRIEF DESCRIPTION OF THE INVENTION

In order to achieve the above object, the content usage device according to the present invention is a content usage device in a network system including a plurality of content usage devices that are connected to one another via a communication network and use a content which is a digital work, comprising: a license management unit operable to hold license information that is distributed from outside of the content usage device and enables usage of a content; and an output unit operable to use a content in compliance with license information and output the content in at least one manner of a sound, video and data, wherein the license management unit, upon receiving a request of license information from the output unit, requests a license management unit of another content usage device to transfer the license information and acquires the license information, and passes the acquired license information to the output unit, and the output unit uses a content in compliance with the license information passed from the license management unit.

Accordingly, the license management unit requests the license management unit of the other content usage device to transfer the license information and the license management unit acquires the license information. That is, even if the license management unit of the content usage device does not hold the license information, it acquires the license information from the other content usage device. Therefore, a user can operate the content usage device and use a content on the output unit of that content usage device, and as a result, the license information can be used effectively.

Here, the license management unit of the content usage device according to the present invention searches for the license management unit of the other content usage device that holds the license information, and acquires the license information from the other license management unit, when the license management unit does not hold the license information requested by the output unit.

Accordingly, the license management unit specifies only the license management unit that holds the license information among a plurality of the other content usage devices to request it to transfer the license information. Therefore, a wasteful request of requesting the license management units of all the content usage devices to transfer the license information can be omitted.

Also, the license management unit of the content usage device according to the present invention, upon receiving a request of license information from the license management unit of the other content usage device, authenticates the other license management unit that requests the license information, and when the license management unit judges the other license management unit unauthorized, the license management unit prohibits the other license management unit from acquiring the license information.

Accordingly, in a network system that is constructed using a plurality of content usage devices at home, for instance, the content usage device outside of the home cannot acquire the license information from the license management unit of the content usage device on the home network system if the content usage device outside is judged as being unauthorized as a result of the authentication by the license management unit. Therefore, the license information can be prevented from being leaked out.

Here, the present invention can be a content usage device in a network system including a plurality of content usage devices that are connected to one another via a communication network and use a content which is a digital work, comprising: a license management unit operable to hold license information that is distributed from outside of the content usage device and enables usage of a content; and an output unit operable to use a content in compliance with license information and output the content in at least one manner of a sound, video and data, wherein the output unit requests the license management unit of the other content usage device to transfer license information and acquires the license information, and uses a content in compliance with the acquired license information.

Accordingly, the output unit requests the license management unit of the other content usage device to transfer the license information and the license management unit acquires the license information. That is, even if the license management unit of the content usage device does not hold the license information, the output unit of the content usage device can acquire the license information from the other content usage device. Therefore, a user can operate the content usage device and use a content on the output unit of that content usage device, and as a result, the license information can be used effectively.

Furthermore, the present invention can be a network system comprising a plurality of first content usage devices and at least one second content usage device that are connected to one another via a communication network and use a content which is a digital work, wherein the first content usage device includes: a license management unit operable to hold license information that is distributed from outside of the first content usage device and enables usage of a content; and an output unit operable to use a content in compliance with license information and output the content in at least one manner of a sound, video and data, the second content usage device includes the output unit only, the license management unit of the first content usage device, upon receiving a request of license information from the output unit of the first content usage device itself or the other identical first content usage device or the output unit of the second content usage device, requests the license management unit of the other first content usage device to transfer the license information and acquires the license information, and passes the acquired license information to the output unit that requests the license information, and the output unit uses a content in compliance with the passed license information.

Accordingly, the license management unit of the first content usage device requests the license management unit of the other first content usage device to transfer the license information and the license management unit acquires the license management and unit. That is, even if the license management unit of the first content usage device does not hold the license information, that license management unit can acquire the license information from the other first content usage device. Therefore, a user can operate the first content usage device and use a content on the output unit of the first content usage device, and as a result, the license information can be used effectively. Also, assume that a user wants to operate the second content usage device and use a content on the output unit of the second content usage device. In this case, even if the license management unit of the first content usage device that is requested by the output unit of the second content usage device to transfer the license information does not hold it, the license management unit can acquire the license information from the other first content usage device. Therefore, the user can use the content on the output unit of the second content usage device, and as a result, the license information can be used effectively.

Note that the present invention can be realized as a license information acquisition method by which the content usage device acquires the license information or a program for having a computer perform steps of the method, and distributed via a recording medium such as a CD-ROM and a transmission medium such as a communication network.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings.

DETAILED DESCRIPTION OF THE INVENTION

The content usage device and the network system according to the embodiment of the present invention will be explained below, with reference to the figures.

Figure 1:
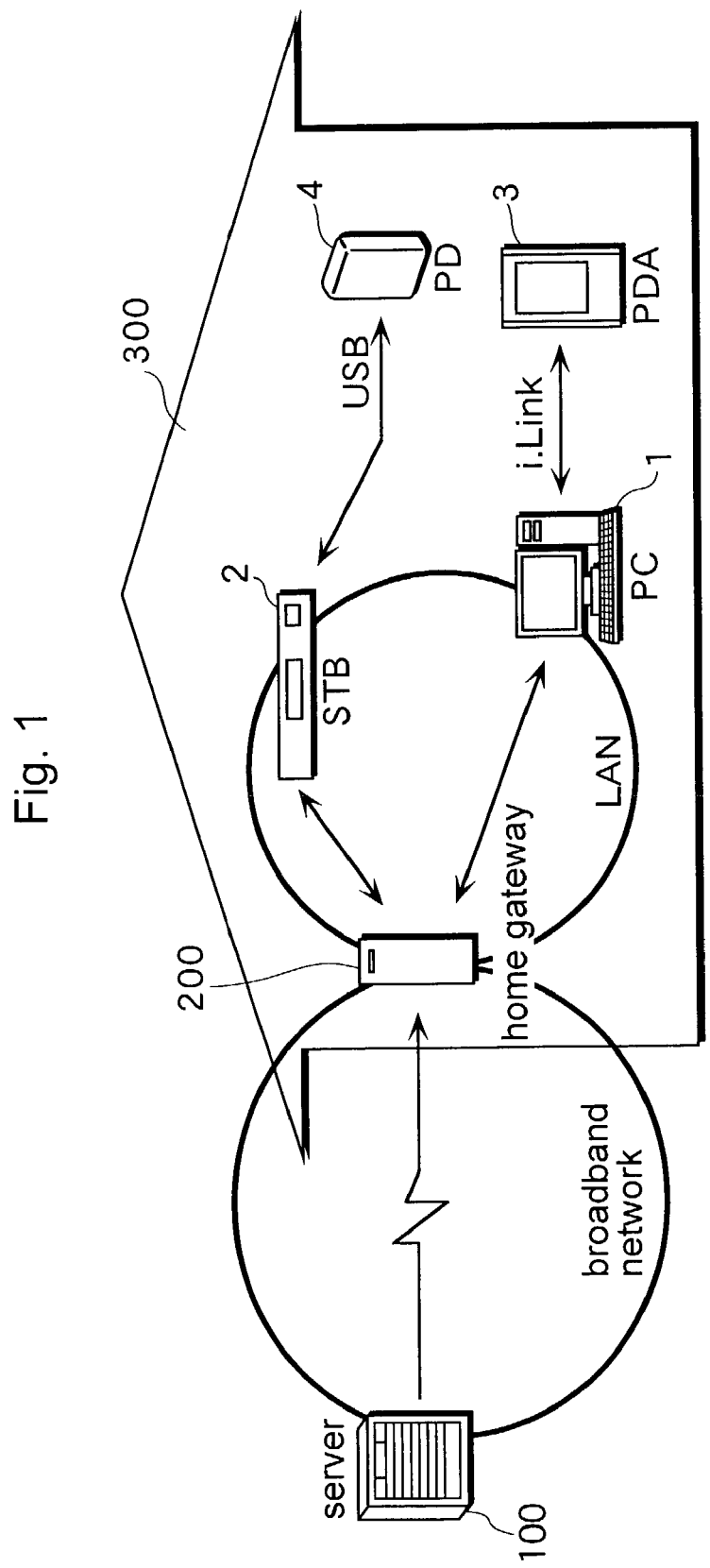
FIG. 1 is a diagram that shows a structure of the entire system including a content usage device and a network system according to the embodiment of the present invention.

FIG. 1 is a diagram that shows a structure of the entire system including the content usage device and the network system according to the embodiment of the present invention.

This entire system is a system for using a content at home, which is a digital work such as music or video distributed from an external source. This system distributes a content, and includes a server 100 that generates license information necessary for usage of the content, and a network system according to the present embodiment (hereinafter referred to as "home network 300") that is connected to the server 100 via a broadband network.

The home network 300 is a network system in which any of a plurality of terminal devices located in a home can use the content distributed from the server 100 using the license information. This home network 300, including a home gateway 200 including an ADSL modem, for instance, and four content usage devices 1~4 according to the present embodiment that use the content distributed from the server 100 using the above-mentioned license information, is configured in the home. Data is sent and received between the content usage devices 1~4 and the server 100 via the home gateway 200. Here, the home gateway 200 having a firewall function keeps security of the content usage devices 1~4.

Figure 2:
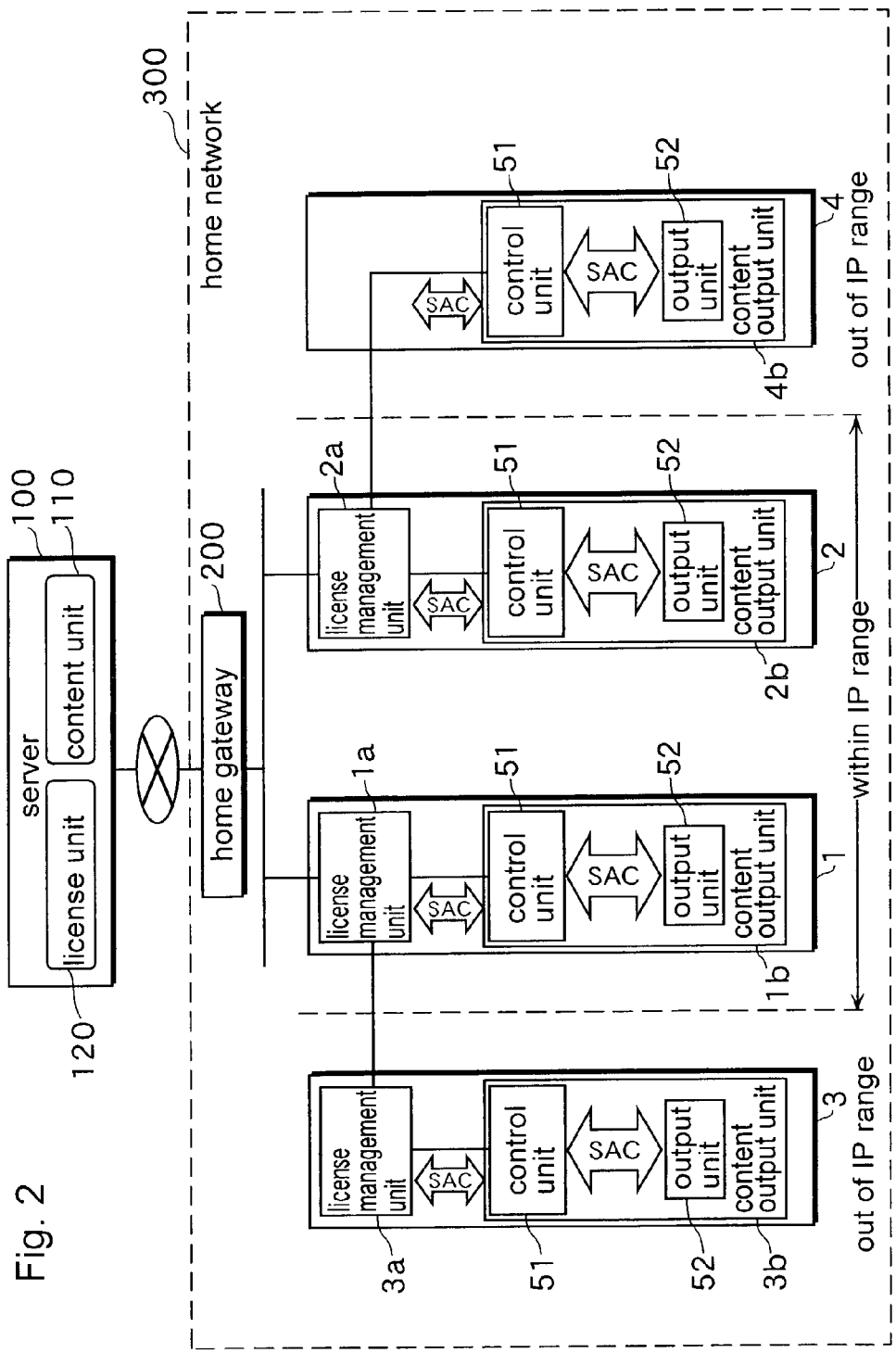
FIG. 2 is a functional block diagram of the entire system as shown in FIG. 1.

FIG. 2 is a functional block diagram of the entire system as shown in FIG. 1.

The server 100 includes a license unit 120 that generates license information and distributes it, and a content unit 110 that distributes the content and others. There may be a plurality of servers 100.

The content unit 110 includes at least a storage unit that stores a lot of encrypted contents, and a sending and receiving unit that receives a content distribution request and sends the requested content.

The license unit 120 includes at least a license information generation management unit that generates the requested license information and manages it, and a sending and receiving unit that receives the license information request and instructs the license information generation management unit to generate the license information, and sends the generated license information.

When a user purchases a license including a wide range of usage rules for using a content, the license information generation management unit generates original license information (hereinafter referred to as "licenser information") having the usage rule as data and holds it. Once the user requests the content usage, the license information generation management unit cuts out information corresponding to a requested part of the usage rule from the licenser information, and combines the cut-out usage rule with a decryption key corresponding to the encrypted content to generate the license information.

In other words, the license information, which is information licensed by combining the details of a part (cut-out part) of the usage rule indicated by the licenser information with the decryption key, enables the user to use the content. More specifically, it includes information such as a number of reproducible times for a predetermined content (reproducible 3 times, for instance), reproducible dates or a time period for a predetermined content (reproducible until Jun. 30, 2001, for instance), and cumulative reproducible time for a predetermined content (reproducible up to 10 hours of the cumulative reproduction time, for instance).

For example, when a user purchases license meaning that "only 10-time reproduction of a movie content is licensed", the license information generation management unit of the license unit 120 generates the licenser information indicating the usage rule of "10-time reproduction of a movie content" and holds it. Once the user requests the content usage, the license information generation management unit cuts out the information of the usage rule of "1-time reproduction of a movie content" from the licenser information indicating the usage rule of "10-time reproduction of a movie content" and renews the licenser information into that indicating the usage rule of "9-time reproduction of a movie content". Furthermore, the license information generation management unit combines the cut-out information with the decryption key of the content to generate the license information meaning that "only 1-time reproduction of a movie content is licensed", and sends it to the sending and receiving unit of the license unit 120.

Meanwhile, the content usage devices 1~4 included in the home network 300 are STBs (set-top box), PCs (personal computer), PDAs (personal digital assistant), and PDs (portable device), for instance. These content usage devices 1~4 may also be component audio sets, VTRs, printers, televisions, etc. in addition to the above if only they use a content.

Here, content usage means specifically reproduction or display of a content, record of the content onto a recording medium such as a DVD-RAM or an SD (Secure Digital) memory card, moving of the content, and others.

Also, four content usage devices 1~4 are connected by LAN or a local line.

For example, the home gateway 200, the content usage device 1 and the content usage device 2 are connected by LAN, have addresses of Ipv6 (Internet Protocol version 6), for instance, respectively, and can communicate directly with each other according to TCP/IP (Transmission Control Protocol/Internet Protocol). A range of the content usage devices that are connected by the LAN, etc. and can communicate directly with each other is hereinafter referred to as "IP range".

Also, the content usage device 2 and the content usage device 4 are connected by a local line pursuant to USB, for instance, the content usage device 1 and the content usage device 3 are connected by a local line pursuant to i.Link (IEEE1394), for instance, and the content usage devices 3, 4 can respectively communicate with other content usage devices and the server 100 on the home network 300 via a certain content usage device connected to them by a local line.

In other words, the content usage devices 1, 2 within the IP range are connected to the server 100 via the home gateway 200 so as to request the server 100 directly to distribute a content and use it. The content usage devices 3, 4 out of the IP range are connected to the server 100 via the content usage devices 1, 2 respectively connected to them by local lines so as to request the server 100 to distribute a content and use it.

The content usage device 1 includes a license management unit 1a that holds and manages license information and a content output unit 1b as an output means that receives a content from the server 100, requests the license management unit 1a to transfer the license information to acquire it, uses the content using this license information, and outputs the content in at least one manner of sounds, videos and data. As in the case of the content usage device 1, the content usage device 2 includes a license management unit 2a and a content output unit 2b, the content usage device 3 includes a license management unit 3a and a content output unit 3b. On the other hand, the content usage device 4 does not include a license management unit but a content output unit 4b only.

Note that the license management units 1a, 2a, 3a and the content output units 1b, 2b, 3b and 4b included in the content usage devices 1~4 are hereinafter referred to as "function units" collectively. Each of these function units includes CPU, ROM, RAM, or the like, and is tamper-proofed by hardware or software.

When the license management units 1a, 2a and 3a permit the content output units 1b, 2b, 3b and 4b to acquire license information and send the license information to the content output units 1b, 2b, 3b and 4b, they interpret the right in the license information, that is, convert it into a format available for the content output units 1b, 2b, 3b and 4b, and send it to them. More specifically, the license management units 1a, 2a and 3a send a content decryption key and necessary information such as time information defining 1-time reproduction or quality control information among the license information to the content output units 1b, 2b, 3b and 4b.

Each of the content output units 1b, 2b, 3b and 4b includes an output unit 52 such as a liquid crystal display screen or a loudspeaker that uses a content and outputs videos and sounds of the content, and a control unit 51 that requests the license information and the content to acquire them and controls the output unit 52 in compliance with the acquired license information and content.

For example, when the license management unit 1a of the content usage device 1 holds the license information distributed from the server 100 meaning that "only 1-time reproduction of a movie content is licensed", once a user operates the content usage device 1 to reproduce the content on the content usage device 1, the control unit 51 of the content output unit 1b requests the license management unit 1a to transfer the license information meaning that "reproduction of a movie content is licensed" or the license information that limits the number of reproduction times meaning that "only 1-time reproduction of a movie content is licensed". As a result, the control unit 51 of the content output unit 1b acquires the license information held by the license management unit 1a meaning that "only 1-time reproduction of a movie content is licensed" from the license management unit 1a. The control unit 51 of the content output unit 1b further requests the server 100 to distribute the movie content and acquires it, and then can reproduce the movie content only once on the output unit 52 using the acquired license information and the content.

Although the home network 300 includes four content usage devices in the present embodiment, the number of content usage devices in the network system of the present invention is not limited to four. Furthermore, although the control unit 51 of the content output unit requests the server 100 to issue a content to acquire it in the present embodiment, it may read out the encrypted content from CD-ROM inserted into the content usage device to acquire it, for example.

Overall operation of the home network 300 in the present embodiment will be explained below.

Figure 3:
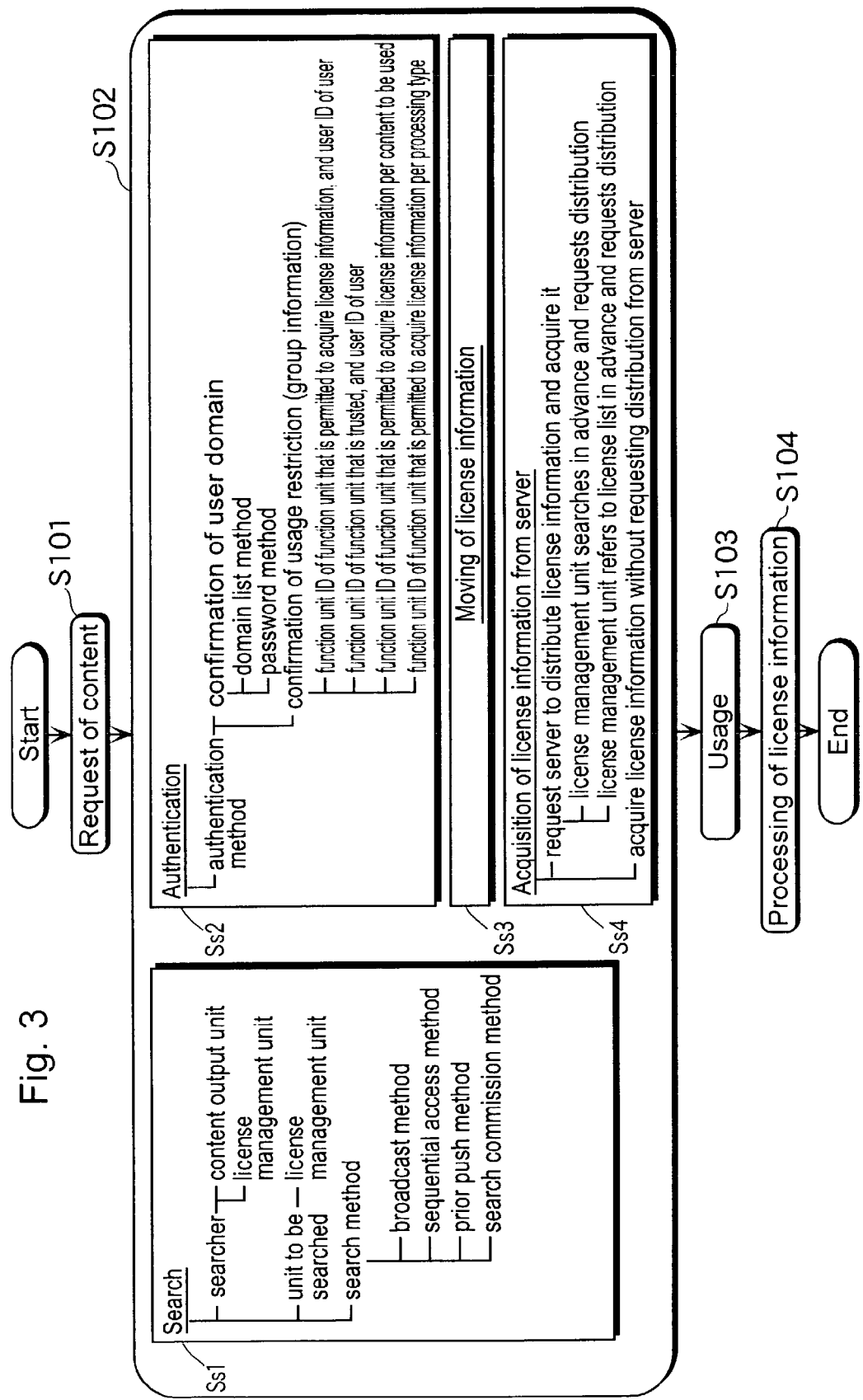
FIG. 3 is a flowchart that shows overall operations in the network system as shown in FIG. 1.

FIG. 3 is a flowchart that shows overall operation of the home network 300 in the present embodiment.

First, when a user operates any of the content usage devices 1~4 in the home network 300 to use a content, the content output unit of the content usage device requests the content unit 110 of the server 100 to distribute the content that the user wants to use (Step S101).

In response to the request of the content, the following processing is performed in the home network 300: processing (Ss1) of searching for the license management unit that holds the license information necessary for the content usage, processing (Ss3) of moving the license information from the license management unit that holds it, processing (Ss2) of authenticating the function unit to which the license information is to be moved by determining whether it is authorized or not before the license management unit that holds the license information moves it, and processing (Ss4) of acquiring the license information from the server 100 when there is not the license information in the home network 300 (Step S102).

The license information is moved to any of the above content output units, and then the content output unit which has acquired the license information uses the content distributed from the content unit 110 of the server 100 using the license information (Step S103).

And finally, in the home network 300, processing of the moved license information is performed (Step S104).

In the search executed in Step S102 (Processing Ss1), the searcher may be either the content output unit that requests the license information or the license management unit that receives the request from the content output unit. In either case, the units to be searched are the license management units 1a, 2a and 3a on the home network 300.

There are following four search methods: the broadcast method of inquiring of all the license management units 1a, 2a and 3a simultaneously about whether they hold the requested license information, the sequential access method of inquiring of the license management units 1a, 2a and 3a individually and sequentially about whether they hold the license information, the prior push method of having the searcher memorize what kind of license information is held in which license management unit 1a, 2a or 3a, and the search commission method of commissioning one of the license management units to search the license information and then commissioning another license management unit to search the license information when the former does not hold it. The search is performed by one of these four methods.

Meanwhile, in Step S102, each of the license management unit 1a, 2a and 3a authenticates the function unit to which the license information is to be moved by confirming the user domain set as a range where the license information can be moved and the usage restriction for restricting the function unit which is permitted to acquire the license information held by the license management unit 1a, 2a or 3a (Processing Ss2).

In other words, each of the license management unit 1a, 2a 3a determines whether the function unit to which the license information is to be moved belongs to the identical user domain or not, and further determines whether the function unit is subject to the usage restriction or not. And each of the license management unit 1a, 2a and 3a judges that the function unit is authorized only when the user domain of the function unit is identical to that of the license management unit itself and the function unit is subject to the usage restriction.

Whether or not the function unit belongs to the identical user domain is determined by a domain list method of determining by referring to a domain list in which function unit IDs and others are registered for identifying respective function units, or a password method of determining by collating with passwords held by respective function units.

Also, the usage restriction is determined depending upon group information including predetermined data memorized in each of the license management units 1a, 2a and 3a.

In this group information, function unit IDs and function units that are permitted to acquire license information and user IDs of users, function unit IDs of the function units that the license management unit 1a, 2a and 3a trust and user IDs, function unit IDs of the function units that are permitted to acquire the license information for per detail of the license information, that is, per content or service to be used, or function unit IDs of the function units that are permitted to acquire the license information per processing type are registered.

In summary, each of the license management unit 1a, 2a and 3a confirms whether or not the function unit ID of the function unit to which the license information is to be moved or the user ID indicated by the function unit is included in the function unit IDs or the user IDs registered in the above group information so as to judge whether the function unit to which the license information is to be moved is subject to the usage restriction or not.

In the processing of moving the license information in Step S102 (Processing Ss3), the license management unit 1a, 2a or 3a that holds the license information sends the license information to the function unit that requests it.

At that time, the license management unit 1a, 2a or 3a that holds the license information divides the license information and sends a part of it, or sends the whole license information without dividing it, depending upon the details of the license information request. Here, dividing the license information means dividing the usage rule included in the license information. For example, the license management unit 1a, 2a or 3a that holds the license information divides the license information including the usage rule of limiting the number of reproducible times for a content to 10 times at most into the license information including the usage rule of limiting the number of reproducible times for the content to 2 times at most and the license information including the usage rule of limiting the number of reproducible times for the content to 8 times at most, and sends either one of them. Also, the usage rule to be divided may be a reproducible time period or cumulative reproduction time for the content.

Furthermore, when the license management unit 1a, 2a or 3a that holds the license information sends the license information, it also sends a message of recommending early usage of the license information depending upon the usage rule included in the license information.

For example, when the license information to be sent includes the usage rule of limiting a reproducible period for a content, a very short period such as 1 day, the license management unit 1a, 2a or 3a that holds the license information sends the license information to the function unit that requests it, and also sends a message of recommending immediate usage. Note that the details of this message are indicated by setting a flag or not, for instance.

Once receiving the message and the license information, the function unit interprets the message and uses the received license information immediately, and thereby the reproducible period for the content is prevented from expiring though the content is unused.

There are two methods of acquiring the license information from the server 100 in Processing Ss4 of Step S102: a method in which each of the license management units 1a, 2a and 3a requests the server 100 to distribute the license information to acquire it, and a method in which the server 100 distributes the license information regularly so that the license management unit 1a, 2a and 3a can acquire it without requesting the server 100 to distribute the license information.

When each of the license management units 1a, 2a and 3a requests the server 100 to distribute the license information, it searches for other license management units that hold the desired license information in advance to confirm that there is no license management unit that meets the usage rule, or refers to a license list indicating what kind of license information is held on the other home networks 300 to confirm that the desired license information is not registered in the license list, and thereby, the holding of the license information is prevented from being overlapped on the home network 300.

In the search in Step S102 (Processing Ss1), as shown in FIG. 3, the case where any of the license management units 1a, 2a and 3a searches for the other license management units that hold the license information as the searcher will be explained below.

In this case, each of the content output units 1b, 2b, 3b and 4b requests the content to be used and further requests any of the license management units 1a, 2a and 3a to transfer the license information necessary for the content usage. When the license management unit that receives the request does not hold the license information, it searches for the other license management unit that holds the license information.

After the search, the license management unit acquires the license information from the license management unit if it meets the search condition, and the content output unit that has requested the license information acquires the license information from the license management unit that has been requested and searched it.

Figure 4:
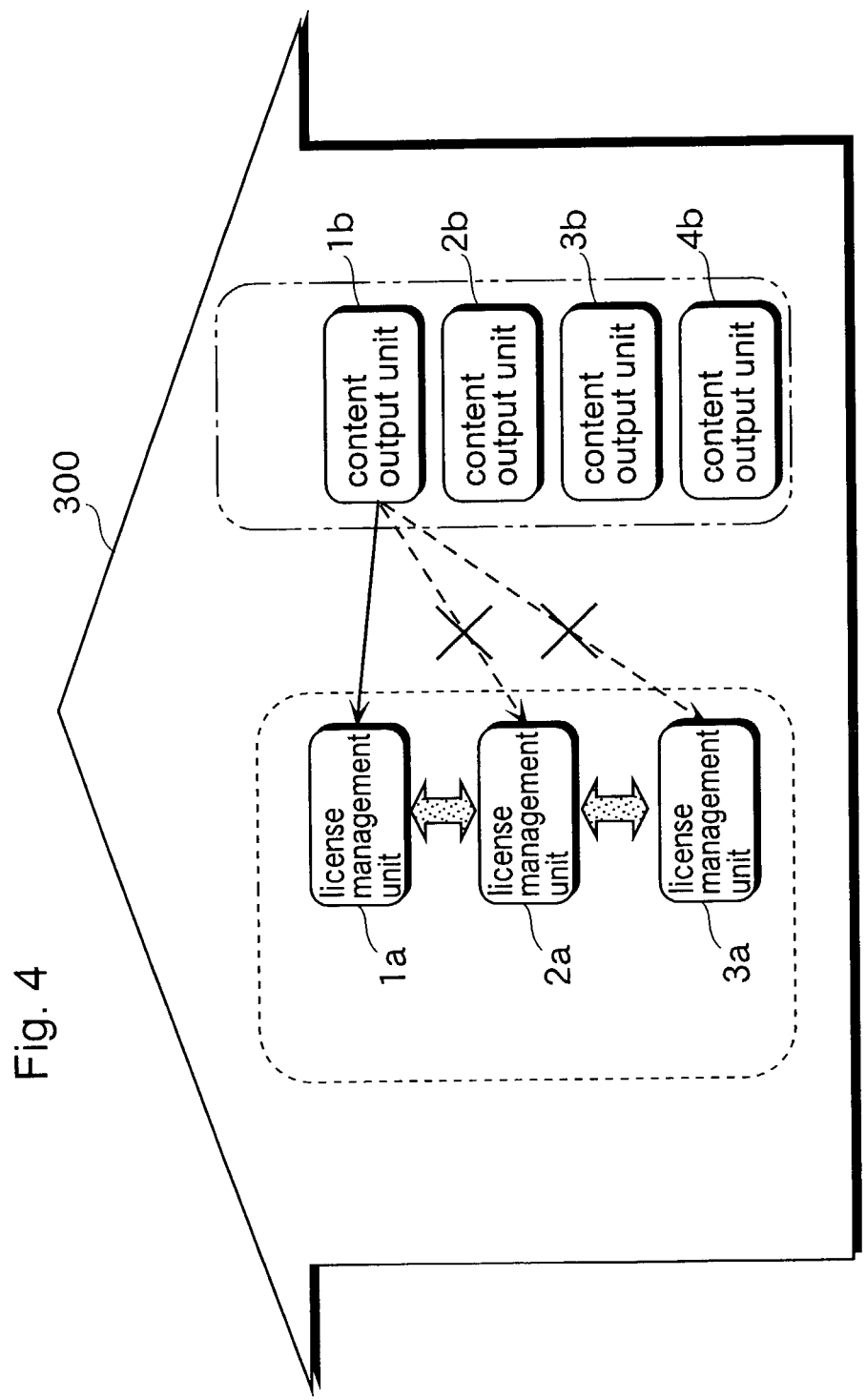
FIG. 4 is a schematic functional block diagram that shows how the license management units of the content usage devices in the network system as shown in FIG. 1 make searches.

FIG. 4 is a functional block diagram of the home network 300 that shows how the license management unit 1a searches for the license management unit that holds the license information requested by the content output unit 1b. In this figure, the home gateway 200 is omitted.

When the content output unit 1b requests the license information, it always requests the license management unit 1a included in the same content usage device 1 to transfer the license information. Likewise, the content output unit 2b and the content output unit 3b request the license management unit 2a and the license management unit 3a, respectively to transfer the license information.

Figure 5:
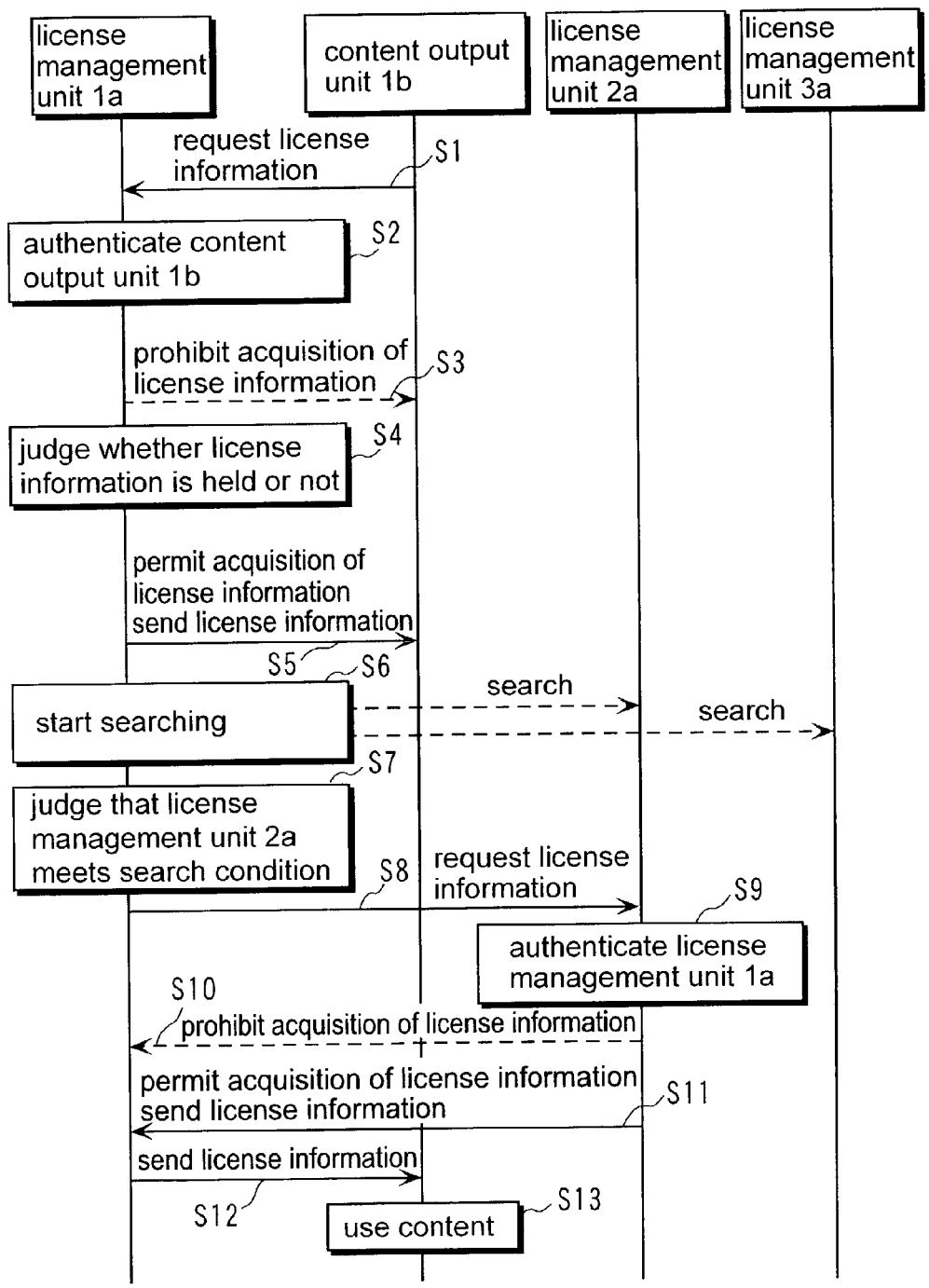
FIG. 5 is a sequence diagram that shows how the license management unit of the content usage device in the network system as shown in FIG. 1 operates to search for the license information, and then, the content output unit operates to acquire license information.

FIG. 5 is a diagram that shows a sequence from the content output unit 1b requests license information until it uses a content using the license information.

A sample of the operations according to the present embodiment will be explained with reference to FIG. 5.

First, the content output unit 1b requests the license management unit 1a to transfer the license information meaning that "reproduction of a movie content is licensed" or the license information that limits the number of reproduction times meaning that "only 1-time reproduction of a movie content is licensed" (Step S1).

Then, the license management unit 1a that is requested the license information authenticates the content output unit 1b to which the license information is to be moved (Step S2). When the license management unit 1a judges that the content output unit 1b is unauthorized, as a result, it prohibits the content output unit 1b from acquiring the license information, and notifies the content output unit 1b that it cannot acquire the license information (Step S3).

On the other hand, when the license management unit 1a judges that the content output unit 1b is authorized in Step S2, it determines whether it holds the requested license information in itself (Step S4), and if it holds the license information, it permits the content output unit 1b to acquire the license information and sends it (Step S5).

When the license management unit 1a decides that it does not hold the requested license information in Step S4, it starts searching for other license management units that hold the license information (Step 6).

When the license management unit 1a judges that the license management unit 2a meets the search condition as a result of the search (Step S7), it accesses the license management unit 2a to request the license information (Step S8).

Once receiving the request, the license management unit 2a authenticates the requesting license management unit 1a to which the license information is to be moved is authorized or not (Step S9). When the license management unit 2a judges that the license management unit 1a is unauthorized, as a result, it prohibits the license management unit 1a from acquiring the license information and notifies it that it cannot acquire the license information (Step S10).

On the other hand, when the license management unit 2a judges that the license management unit 1a is authorized in Step S9, it permits the license management unit 1a to acquire the license information, and sends the requested license information to the license management unit 1a (Step S11).

The license management unit 1a that has acquired the license information permits the content output unit 1b to acquire the license information, and sends the license information to the content output unit 1b (Step S12). And the content output unit 1b that has acquired the license information uses the content distributed from the content unit 110 of the server 100 using this license information (Step S13).

In the above-mentioned home network 300, the license information is sent and received pursuant to a secure communication protocol such as SAC (Secure Authenticated Channel). Also, each function unit may send the license information, which is encrypted with the function unit ID of the other function unit to which the license information is to be sent, to the other function unit. In this case, the function unit that receives the license information decrypts the license information which has been encrypted with the function unit ID of itself.

As described above, each of the content usage devices 1~4 searches for the other content usage devices that hold necessary license information, and acquire the license information from the other content usage device. Therefore, they can acquire and use the necessary license information even if they do not hold it themselves. In other words, the other content usage devices on the home network 300 in addition to the content usage device that holds the license information can also use the content using the license information. As a result, the license information that has been already distributed from the server 100 to the home network 300 can be used effectively.

Furthermore, each of the license management unit 1a, 2a and 3a of the content usage device 1, 2 and 3 searches for the license management units of the other content usage devices that hold the license information and requests the license management unit that meets the search condition only to transfer the license information. Therefore, wasteful request processing can be saved such as requesting the license management units of all other content usage devices to transfer the license information.

In Step S9, the license management unit 2a authenticates the license management unit 1a that requests the license information, but the license management unit 1a may authenticate the content output unit 1b that requests the license information. In this case, when the license management unit 2a judges that the content output unit 1b is authorized as a result, it sends the requested license information to the license management unit 1a. Also, the license management unit 2a may authenticate both the license management unit 1a and the content output unit 1b.

Next, the case where any of the content output units 1b, 2b, 3b and 4b as a searcher searches for the license management units that hold the license information in Step S102 (Processing Ss1) as shown in FIG. 3 will be explained below.

In this case, each of the content output unit 1b, 2b, 3b and 4b requests a content to be used, and then searches for the license management units that hold the license information necessary to use the content.

Figure 6:
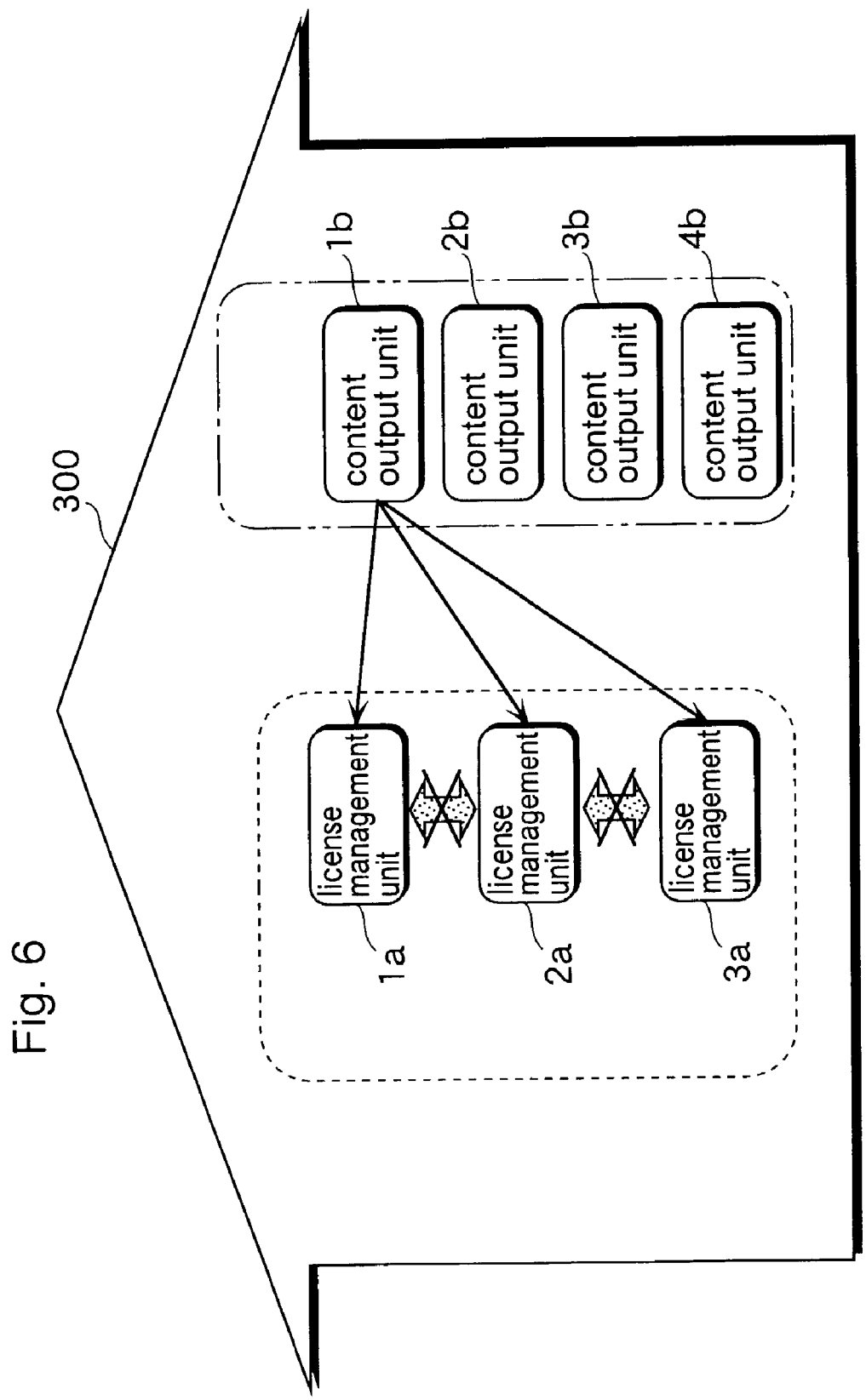
FIG. 6 is a schematic functional block diagram that shows how the content output units of the content usage devices in the network system as shown in FIG. 1 make searches.

FIG. 6 is a functional diagram of the home network system 300 that shows how the content output unit 1b itself searches for the license management units that hold the desired license information. In this figure, the home gateway 200 is omitted.

The content output unit 1b accesses all the license management units 1a, 2a and 3a to search for the license management units that hold the desired license information.

Figure 7:
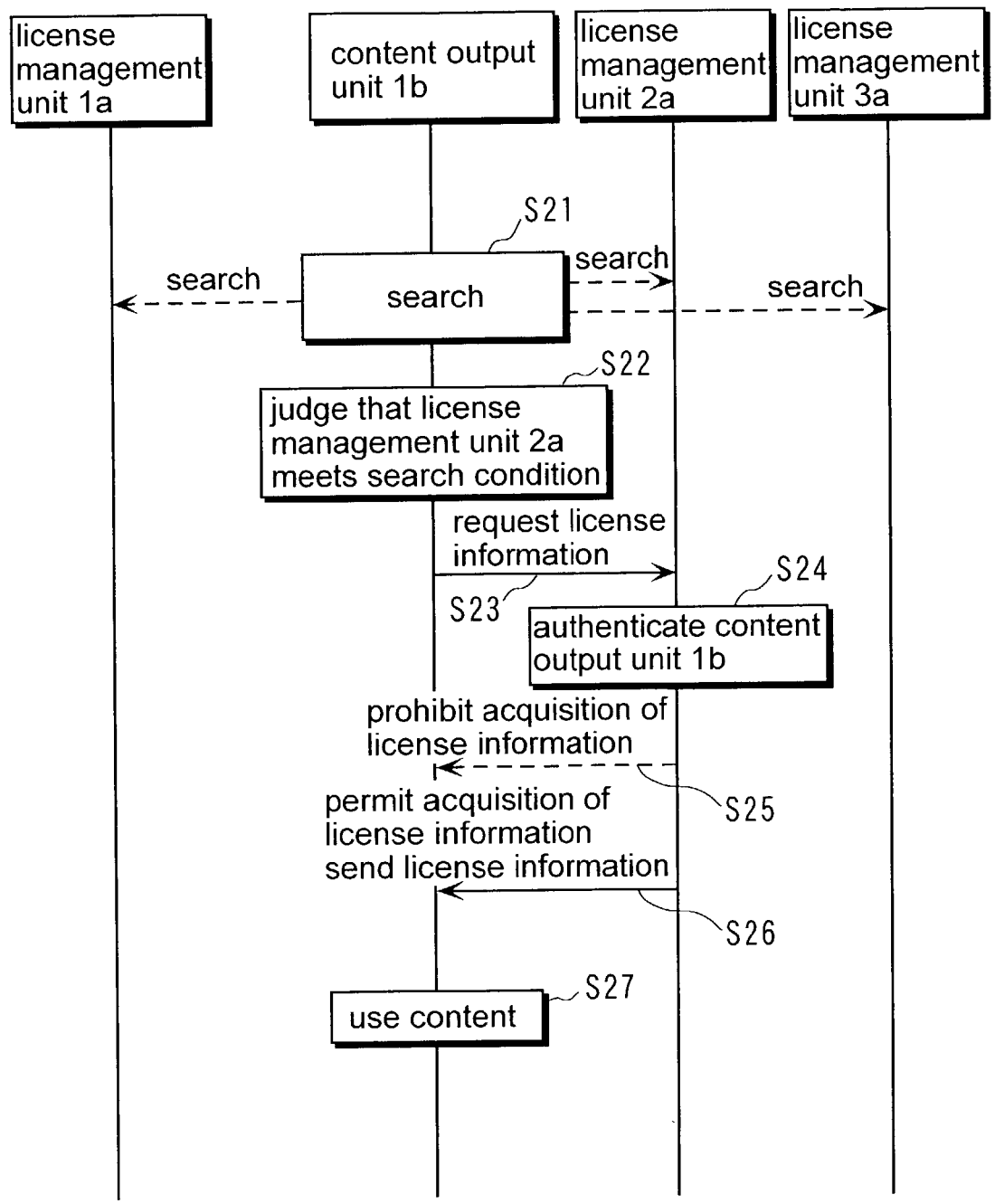
FIG. 7 is a sequence diagram that shows how the content output unit of the content usage device in the network system as shown in FIG. 1 operates to search for license information and acquire it.

FIG. 7 shows a sequence from the content output unit 1b searches for the license information as described above until it uses the content.

A sample of the operations according to the present embodiment will be explained below with reference to FIG. 7.

First, when the content output unit 1b requests the license information meaning that "reproduction of a movie content is licensed", it searches for the license management units that hold such license information in advance (Step S21).

When the content output unit 1b judges that the license management unit 2a meets the search condition as a result of the search (Step S22), it accesses the license management unit 2a to request the license information (Step S23).

Once receiving the request, the license management unit 2a authenticates the content output unit 1b that requests the license information (Step S24). When the license management unit 1a judges that the content output unit 1b is unauthorized as a result, it prohibits the content output unit 1b from acquiring the license information and notifies the content output unit 1b to that effect (Step S25). When the license management unit 1a judges that the content output unit 1b is authorized, it permits the content output unit 1b to acquire the license information and sends the license information (Step S26).

Once acquiring the license information, the content output unit 1b uses the content using this license information (step S27).

As described above, when the searcher is the content output unit 1b, 2b or 3b, all the content output units including the content output unit 1b can use the content by acquiring the license information from the other license management units even if the license management unit 1a is in an inoperative condition. On the other hand, when the searcher is the license management unit 1a, 21 or 3a, if the license management unit 1a is in an inoperative condition, the content output unit 1b that always requests the license management unit 1a to transfer the license information also cannot acquire the license information and goes into an inoperative condition. That is, contrary to the case when the searcher is the license management unit 1a, 2a or 3a, when the searcher is the content output unit 1b, 2b or 3b, the malfunction of one function unit of the content usage device can be prevented from having a bad effect on the other function units.

When each of the content output units 1b, 2b and 3b searches for the license management units that hold the desired license information, it first requests the license management units 1a, 2a and 3a in the content usage devices 1, 2 and 3 including the content output units 1b, 2b and 3b, respectively, to transfer the license information, and then may search for the other license management units that hold the license information if the license management unit 1a, 2a and 3a does not hold the license information.

As described above, even if searcher of the license management units that hold the license information is the content output unit 1b, 2b, 3b or 4b of the content usage device 1, 2, 3 or 4, the content usage device 1, 2, 3 and 4 can acquire the license information from the other content usage device and use the license information effectively, as in the case where the searcher is the license management unit 1a, 2a or 3a.

Next, the search according to the broadcast method in Step S102 (Processing Ss1) will be explained below.

Figure 8:
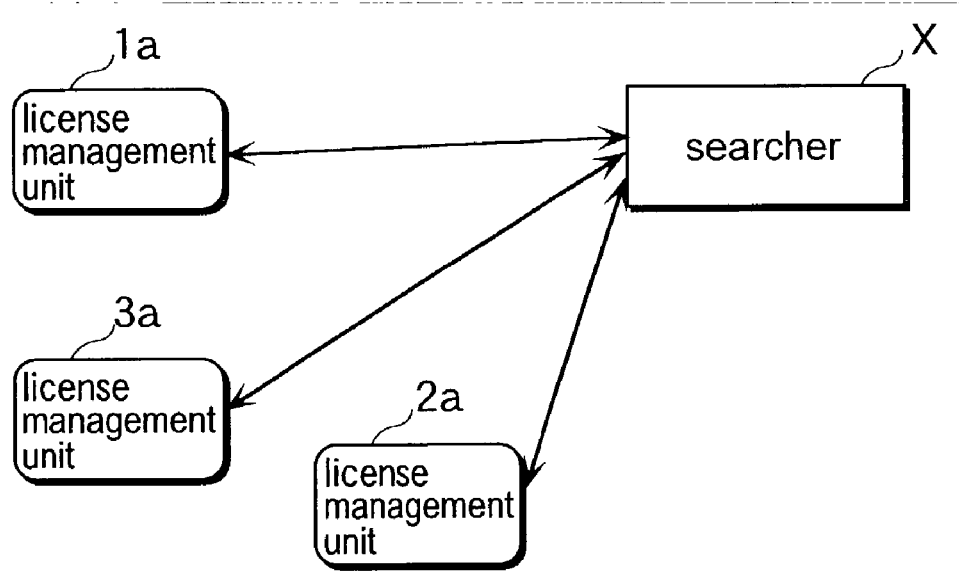
FIG. 8 is a descriptive diagram that shows a search method according to the broadcast method.

FIG. 8 is a descriptive diagram that shows the search according to the broadcast method.

According to the broadcast method, the searcher X that is any of license management units 1a, 2a and 3a and the content output units 1b, 2b, 3b and 4b broadcasts information inquiring of the license management units 1a, 2a and 3a whether they hold the requested license information or not. Each of the license management units 1a, 2a and 3a notifies the searcher X whether they hold the license information or not in response to the broadcast inquiry information. The searcher X finds the license management unit that meets the search condition based on the notice from the license management units 1a, 2a and 3a, and requests the license management unit to transfer the license information. Note that all the license management units 1a, 2a and 3a are shown in FIG. 8, but when the searcher X is the license management unit, above-mentioned search is made between the license management unit that is the searcher X and other license management units.

Here, when the searcher X grasps that a plurality of the license management units hold the inquired license information based on the notice results of the license management units 1a, 2a and 3a, it requests the license management unit that answers first among them to transfer the license information.

Note that the searcher X may select the license management unit from which it acquires the license information, based on the details of the license information held by the plurality of the license management units. For example, when the license management unit 1a notifies that it holds the license information meaning that "reproduction of a movie content is licensed until Dec. 31, 2003" and the license management unit 2a notifies that it holds the license information meaning that "reproduction of a movie content is licensed until Dec. 31, 2004", in response to the inquiry of the searcher X about whether the license information meaning that "reproduction of a movie content is licensed until Dec. 31, 2002" is held or not, the searcher X selects the license management unit 2a from the license management units 1a and 2a to acquire the license information with a shorter effective period. Also, when a plurality of the license management units notify that they hold the license information in response to the inquiry information from the searcher X, the searcher X may notify a user of the content usage devices that hold the desired license information or their license management units and the details of the license information held by them, and acquire the license information from the license management unit of the content usage device selected by the user's operation.

Furthermore, in the above case, the searcher X broadcasts the inquiry information inquiring whether the requested license information is held or not, but the searcher X may designate a content corresponding to the requested license information for the license management unit 1a, 2a or 3a to be searched so as to broadcast the content-corresponding inquiry information inquiring of what type of license information it holds for the content.

Figure 9:
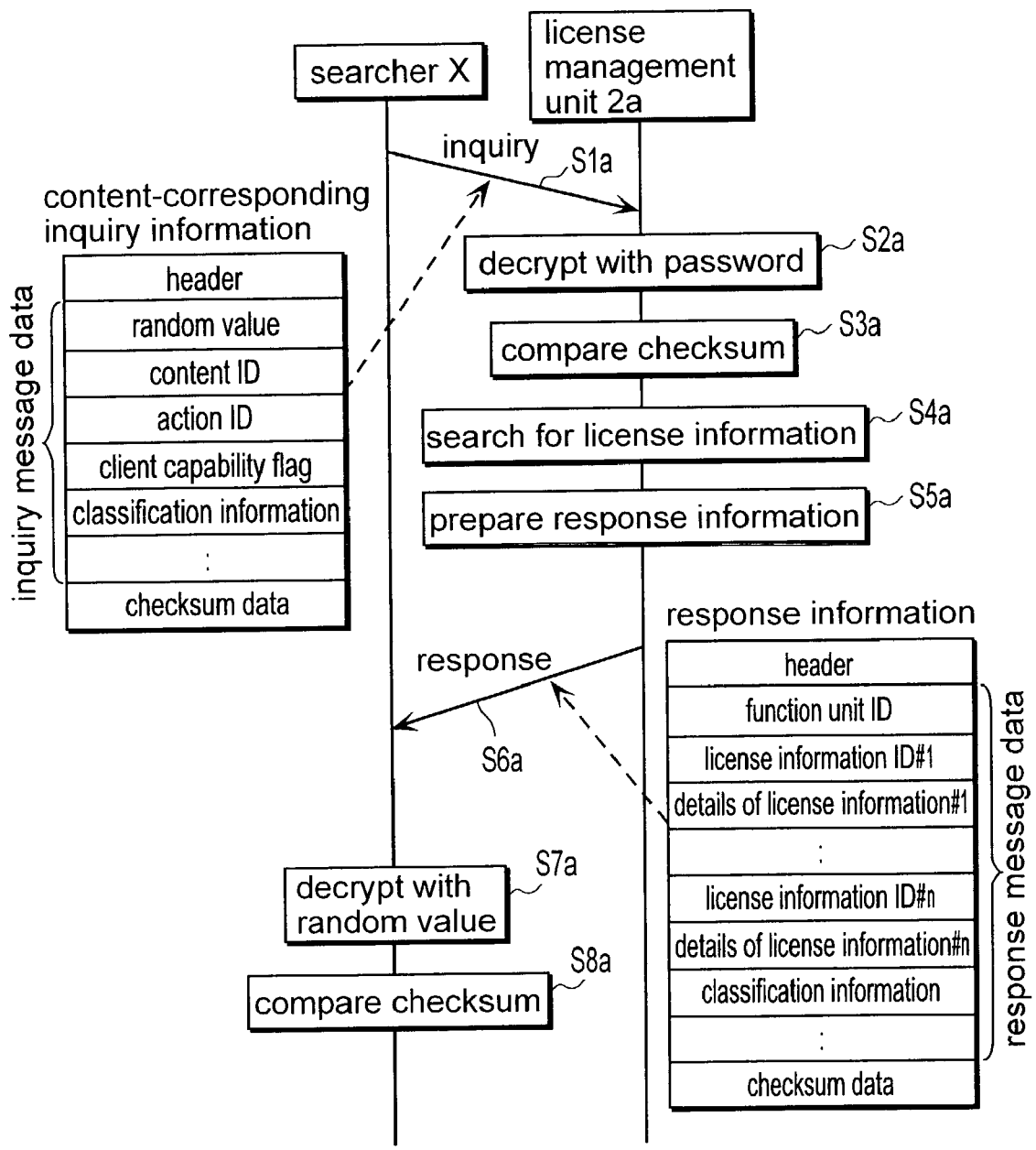
FIG. 9 is a sequence diagram that shows a searcher operates to inquire of the license management unit for the license information.

FIG. 9 shows a sequence from the searcher X sends the content-corresponding inquiry information to the license management unit 2a until it receives the response from the license management unit 2a.

First, the searcher X generates the content-corresponding inquiry information and sends it to the license management unit 2a (Step S1a).

The content-corresponding inquiry information includes a header, inquiry message data indicating the details of the inquiry and checksum data for detecting errors of sending and receiving data.

The inquiry message data includes a (i) random value that is used as a key for encrypting and decrypting information and generated by a random number, (ii) identification information for identifying a content corresponding to requested license information (hereinafter referred to as "content ID"), (iii) identification information for identifying usage details such as reproduction or copying of the content (hereinafter referred to as "action ID"), (iv) a flag for indicating the capability of the searcher X such that it can reproduce or copy a content, and determine a content usable period included in the acquired license information as a usage rule (hereinafter referred to as "client capability flag", (v) and type information indicating the role of the searcher X on the home network 300 such as a role as a server or a client. Note that the inquiry message of the content-corresponding inquiry information may include usage period information notifying the usage period of the content.

Here, the checksum is one of the error detection methods in sending and receiving data, and the checksum data indicates a value obtained by dividing data into blocks before sending and summing up data in each block that is regarded as a numerical value. That is, the checksum data in the content-corresponding inquiry information indicates the total of the numerical values obtained by dividing the inquiry message data, as mentioned above.

Also, the inquiry message data and the checksum data in the content-corresponding inquiry information are encrypted with a common password shared with the license management unit 2a. In other words, the sample as shown in FIG. 9 is realized when the searcher X and the license management unit 2a share the common password. The searcher X cannot send the content inquiry information to the license management unit that does not hold the common password so as to receive the response to the inquiry.

By sending this content-corresponding inquiry information, the searcher X designates the content indicated with the above content ID and the usage details indicated by the action ID to the license management unit 2a, and inquires of the license management unit 2a what type of license information it holds for the content and the usage details.

Next, once receiving the content-corresponding inquiry information, the license management unit 2a decrypts the inquiry message data and the checksum data in the content-corresponding inquiry information with the above password (Step S2a).

Then, the license management unit 2a compares the value indicated by the decrypted checksum data with the above total of the numerical values obtained by dividing the decrypted inquiry message data (Step S3a).

If these values are not identical as a result of the comparison, the license management unit 2a does not respond to the inquiry from the searcher X.

If these values are identical, the license management unit 2a searches for the license information corresponding to the inquiry message information among the license information it holds (Step S4a), and prepares response information including the search result (Step S5a).

Here, the license management unit 2a determines whether it may send the license information that meets the above search condition to the searcher X based on the client capability flag, the type information or the usage period information included in the received content-corresponding inquiry information.

In other words, when the license management unit 2a (i) judges based on the client capability flag that the searcher X cannot determine the usable period of the above license information, (ii) judges based on the type information that the searcher X undertakes a role as a server, or (iii) judges there is no license information that can be used within the usage period of the content indicated by the usage period information among those that meets the above search condition, for example, it determines that it should not send the license information that meets the above search condition to the searcher X.

Then, when the license management unit 2a determines that it should not send the license information that meets the above search condition, it sends a sending rejection message notifying the searcher X in advance that it won't send the license information in response to the request of the license information from the searcher X, even if it holds this license information.

Also, the response information includes a header, response message data indicating the above search result and checksum data for detecting errors of sending and receiving data.

The response message data includes, for instance, a function unit ID that is identification information of the license management unit 2a itself that has prepared the response information, license information ID that is identification information of the license information that meets the search condition of the search in Step S4a, details of the license information ID, and type information indicating a role of the license management unit 2a on the home network 300. When there is a plurality of license information that meets the above search condition, the license information ID of each license information and its details are included in the response message data. Note that the above sending rejection message is included in the response message.

The checksum data included in the response information is data indicating a value obtained by dividing the response message data in the response information into blocks and summing up data in each block that is regarded as a numerical value.

Then, the license management unit 2a encrypts the response message data and the checksum data in the response information with a random value included in the content-corresponding inquiry information received from the searcher X, and sends back the response information to the searcher X (Step S6a).

Next, once receiving the above response information from the license management unit 2a, the searcher X decrypts the response message data and the checksum data included in the response information with the random value included in the content-corresponding inquiry information (Step S7a), and compares the value indicated by the decrypted checksum data with the above total of the numerical values obtained by dividing the decrypted response message data (Step S8a).

If these values are identical as a result of the comparison, the searcher X recognizes that it received the response information without fail and grasps the license information corresponding to the content and the usage details the searcher X itself has designated and the license management unit 2a holds. Also, if these values are not identical as a result of the comparison, the searcher X recognizes that details of the response information are wrong.

Furthermore, when the above sending rejection message is included in the response message data of the response information, the searcher X grasps in advance that it cannot request the license management unit 2a to transfer the license information based on the sending rejection message. Therefore, wasteful operations of the searcher X for requesting the license management unit 2a to transfer the license information can be saved, and thereby the efficiency of the operations of the searcher X can be enhanced.

The searcher X also inquires of other license management units that hold the common password than the license management unit 2a. Based on the response information from each license management unit, the searcher X grasps which license management unit holds the license information corresponding to the content and the usage details which the searcher X itself designates and are most suitable for its own request.

In this case, the searcher X inquires of the license management unit 2a which license information it holds. However, when addresses are set for all the function units on the home network 300 to communicate with one another, it may inquire the address of the function unit to be communicated, or the location (URL (Uniform Resource Locator), for instance) of the license information and the content Operations of the searcher X for acquiring the license information corresponding to the content which the searcher X itself designates and is most suitable for its own request from the license management unit that holds the license information will be explained below with reference to FIG. 10.

Figure 10:
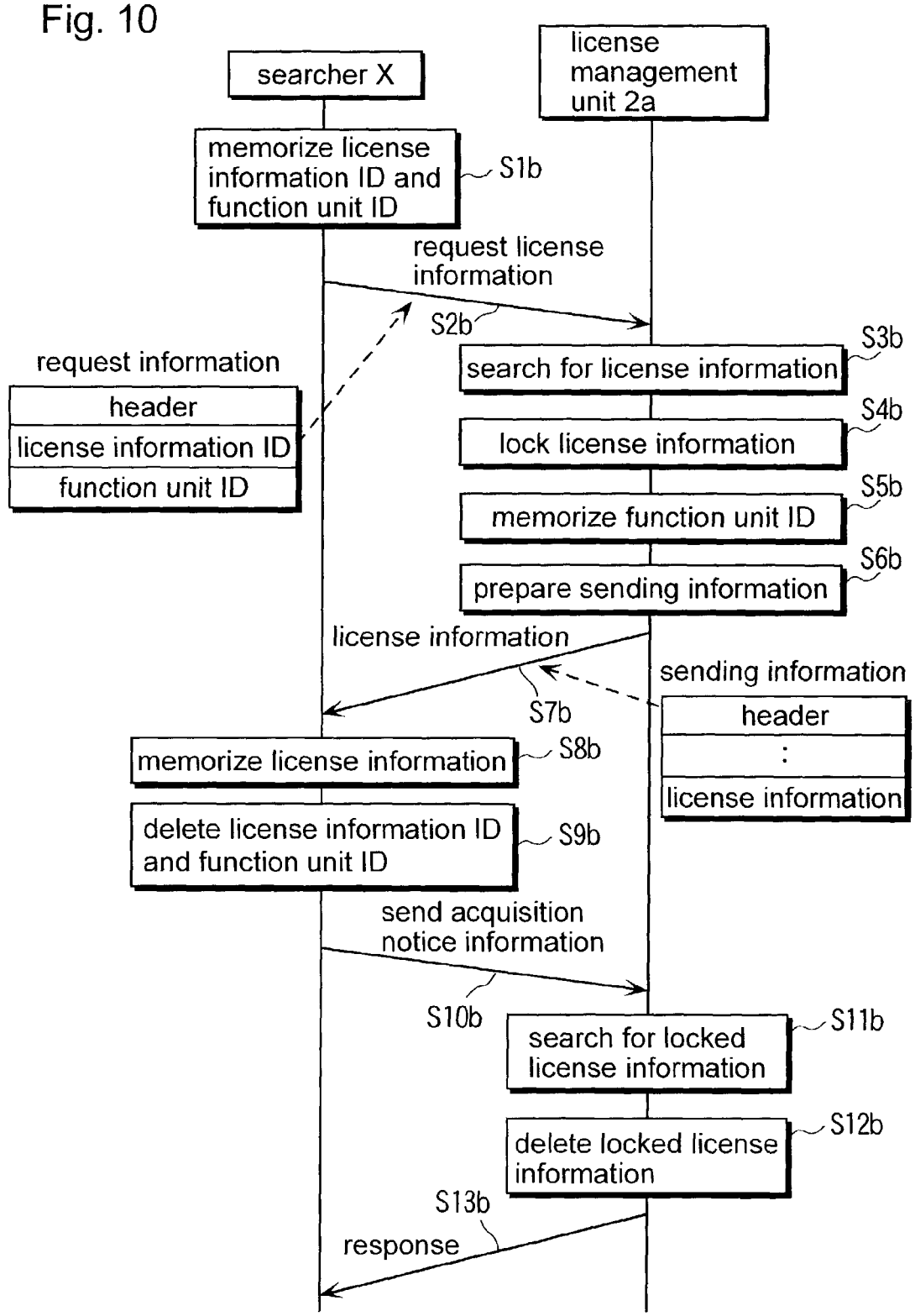
FIG. 10 is a sequence diagram that shows how the searcher operates to acquire license information from the license management unit.

FIG. 10 is a sequence diagram that shows how the searcher X operates to acquire the license information from the license management unit 2a.

In the sample as shown in FIG. 9, once grasping that the license management unit 2a holds the license information that is most suitable for its own request as a result of receiving the response information from each license management unit, the searcher X memorizes the license information ID of the above license information and the function unit ID of the license management unit 2a that holds the license information (Step S1b).

Then, the searcher X sends the request information requesting the license management unit 2a to transfer the license information (Step S2b).

Here, the request information includes a header, license information ID of the requested license information and a function unit ID of the searcher X that sends the request information.

Once receiving the request information, the license management unit 2a searches for the license information having the license information ID indicated by the request information among the license information of its own (Step S3b). When there is the license information that meets the search condition, the license management unit 2a locks the license information so as to reject the following requests of the license information from the other function units (Step S4b).

The license management unit 2a memorizes the function unit ID of the searcher X included in the request information in association with the locked license information (Step S5b), prepares the sending information including the license information and a header (Step S6b), and sends the sending information to the searcher X (Step S7b).

Then, the searcher X receives the sending information from the license management unit 2a, acquires the license information the searcher X itself requests from this sending information to memorize it (Step S8b). The searcher X further deletes the license information ID and the function unit ID of the license management unit 2a memorized in Step S1b (Step S9b). When the searcher X cannot receive the sending information including the license information though it sends the request information, it requests again the license management unit 2a to transfer the license information based on the license information ID and the function unit ID of the license management unit 2a memorized in Step S1b. When the searcher X receives the sending information including the license information, it regards these IDs memorized in Step S1b as unnecessary and deletes them.

Then, the searcher X sends the acquisition notice information notifying that it acquires the requested license information to the license management unit 2a (Step S10b).

Once receiving the acquisition notice information, the license management unit 2a searches for the locked license information memorized in Step S5b (Step S11b), and deletes the license information when it is found (Step S12b).

In other words, even if the license management unit 2a sends the sending information including the license information to the searcher X in Step S7b, it can send the sending information to the searcher X again when it receives the request information from the searcher X again even if the searcher X does not receive the above sending information, because the license management unit 2a memorizes the license information identical to the sent license information in a locked condition in association with the function unit ID of the searcher X. Once receiving the acquisition notice information from the searcher X as mentioned above, the license management unit 2a regards that the sending information is normally received by the searcher X, and deletes the locked license information in Step S12b.

Finally, the license management unit 2a notifies the searcher X that it completes the processing in response to the request from the searcher X (Step S13b).

As described above, the searcher X acquires the license information without fail by sending and receiving the information such as the request information and the sending information to and from the license management unit 2a.

Note that operations of acquiring the license information based on FIG. 10 has been explained, but the process that the license management unit 2a authenticates the searcher X is omitted to simplify the explanation.

Next, the search (Processing Ss1) pursuant to the sequential access method in Step S102 as shown in FIG. 3 will be explained below.

Figure 11:
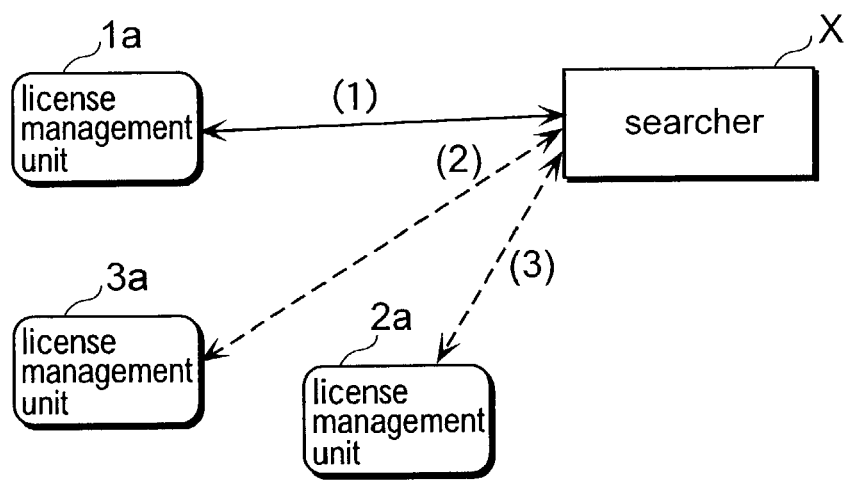
FIG. 11 is a descriptive diagram that shows a search method according to the sequential access method.

FIG. 11 is a descriptive diagram that shows a search method according to the sequential access method.

According to the sequential access method, the searcher X first accesses the license management units 1a, 2a and 3a in a predetermined order ((1)~(3) as shown in FIG. 11) to inquire of each of the license management units whether they hold the desired license information or not. If the searcher X finds the license management unit that holds that license information, then the searcher X stops the above-mentioned inquiry, and then acquires the license information from that license management unit. The above access order is determined in the order of the nearest location from the searcher X on the network first, for example. Note that the searcher X may access at random the license management units 1a, 2a and 3a, respectively, without predetermining the access order. Also, although all the license management units 1a, 2a and 3a are shown in FIG. 11, when the searcher X is a license management unit, the above search is made between that license management unit that is the searcher X and other license management units.

Next, the search (Processing Ss1) pursuant to the prior push method in Step S102 as shown in FIG. 3 will be explained below.

Figure 12:
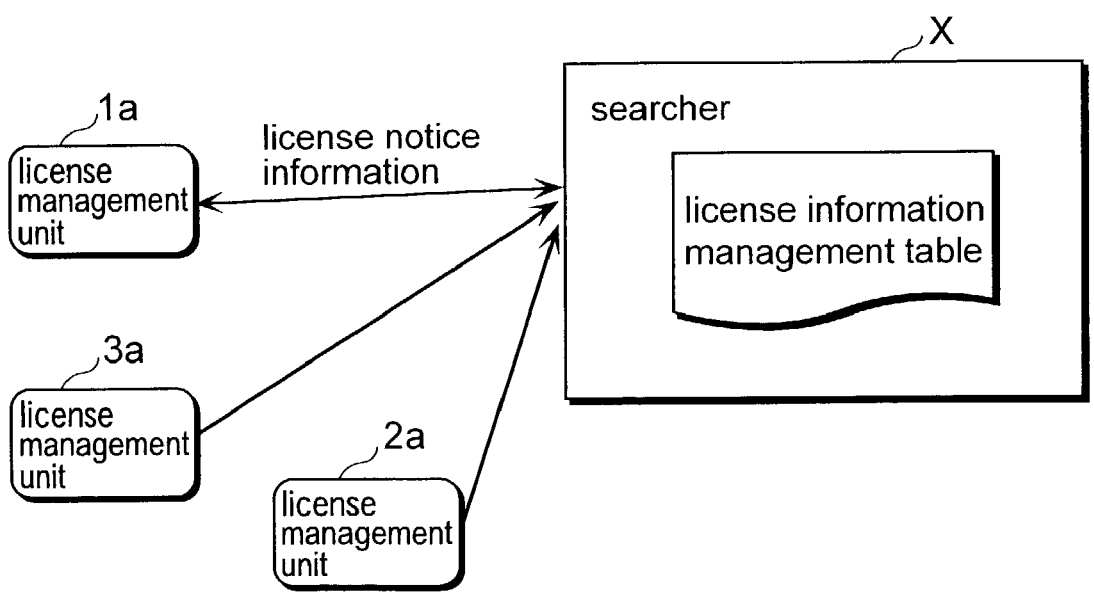
FIG. 12 is a descriptive diagram that shows a search method according to the prior push method.

FIG. 12 is a descriptive diagram that shows a search method according to the prior push method.

According to the prior push method, each of the license management unit 1a, 2a and 3a sends in advance the license notice information notifying the license information that they hold themselves to other license management units 1a, 2a and 3a and the content output units 1b, 2b, 3b and 4b that is to be the searcher X. The searcher X prepares, based on the license notice information, and memorizes the license information management table indicating what type of the license information each of the license management units 1a, 2a and 3a holds. When any of the license management unit 1a, 2a and 3a and the content output unit 1b, 2b, 3b and 4b searches as the searcher X, it searches for the license management unit that holds the desired license information with reference to the license information management table, and acquires the license information from that license management unit. Note that, although all the license management units 1a, 2a and 3a are shown in FIG. 12, when the searcher X is a license management unit, the above search is made between that license management unit that is the searcher X and other license management units.

In the above case, any of the license management units 1a, 2a and 3a and the content output units 1b, 2b, 3b and 4b that is the searcher X memorizes the license information management table. However, a table management terminal device may further be provided on the home network 300 for memorizing the license information management table. In this case, each of the license management units 1a, 2a and 3a notifies the table management terminal device of the license information that it holds when it renews that license information or on a regular basis. Every time the table management terminal device receives the notice, it renews the details of the license information management table. And the searcher X accesses the table management terminal device to refer to the license information management table memorized there, and searches for the license management unit that holds the desired license information.

When each of the license management units 1a, 2a and 3a or the content output units 1b, 2b, 3b and 4b that is the searcher X memorizes the license information management table without the above-mentioned table management terminal device, all the license information management tables memorized in each of them need to be renewed. On the other hand, if the table management terminal device is provided, the license information management tables are under collective management of the table management terminal device. Therefore, the license information management table memorized in the table management terminal device only needs to be renewed, and the license information management table can be easily managed.

When the searcher X grasps that plurality of license management units hold the desired license information as a result of referring to the license information management table, it selects the license management unit from which it should acquire the license information based on the details of the license information such as the effective period that each of the license management units holds. Note that the searcher X may notify a user of the content usage devices or the license management units that hold the desired license information and the details of that license information so as to acquire the license information from the license management unit selected according to the user's operation.

Next, the search (Processing Ss1) pursuant to the search commission method in Step S102 as shown in FIG. 3 will be explained below.

Figure 13:
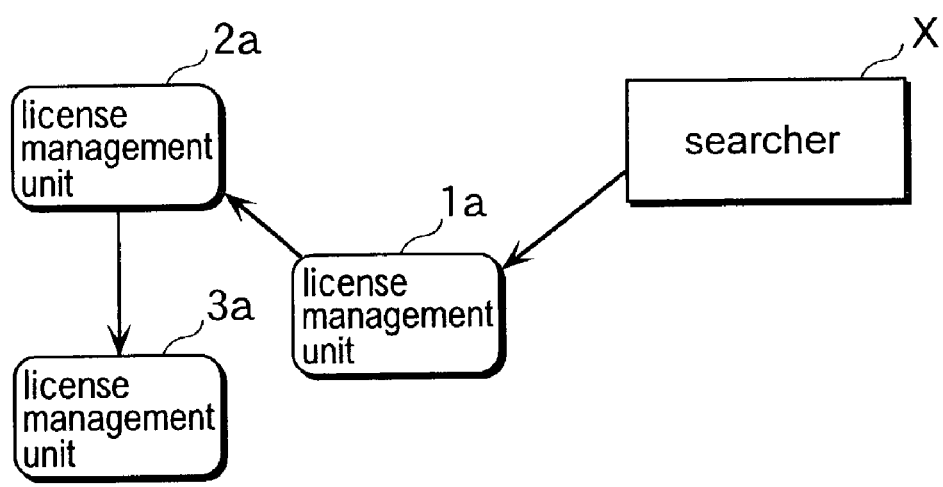
FIG. 13 is a descriptive diagram that shows a search method according to the search commission method.

FIG. 13 is a descriptive diagram that shows a search method according to the search commission method.

According to the search commission method, when the searcher X is any of the content output units 1b, 2b, 3b and 4b, the searcher X first commissions the license management unit 1a, for instance, to search for the desired license information. Once receiving the search commission, the license management unit 1a searches for that license information among the license information that it holds itself, and if there is the license information, it notifies the searcher X of the search result. And the searcher X acquires the license information from the license management unit 1a.

When no license information is found as a result of the search, the license management unit 1a commissions the license management unit 2a to search for the desired license information as mentioned above. If there is the desired license information as a result of searching the license information that it holds itself, the license management unit 2a notifies the searcher X of the search result. However, if no license information is yet found, it further commissions the license management unit 3a to search for the desired license information as mentioned above.

On the other hand, when the searcher X is any of the license management units 1a, 2a and 3a, the searcher X searches for the license information requested by the content output unit 1b, 2b, 3b or 4b among the license information that it holds itself. If there is no license information found, it commissions the other license management unit to search the desired license information, as described above.

According to the search commission method, the searcher X commissions any one of the license management units 1a, 2a and 3a to search for the desired license information, and if there is no license information in any one of these license management units, then the license management unit commissions the other license management unit to search for that license information. Like this, the search commission is repeated until the desired license information is found.

Also, in the above case, when the license management unit finds the desired license information among the license information that it holds itself, it notifies the searcher X of the search result. However, it may directly notify the license management unit that has commissioned the search of the search result.

In this case, the license management unit that has commissioned the search acquires the license information from the license management unit that holds it and sends it to the searcher X. That is, the searcher X acquires the desired license information, not directly from the license management unit that holds it, but indirectly through the other license management unit.

Here, each of the license management units 1a, 2a and 3a store the function unit IDs for identifying the other license management units 1a, 2a and 3a and the content output units 1b, 2b, 3b and 4b with their priorities being assigned. When each of the license management units 1a, 2a and 3a is commissioned a plurality of searches at the same time from the other license management units 1a, 2a and 3a and the content output units 1b, 2b, 3b and 4b with their priorities being assigned, it accepts their commissions in the order of descending priorities.

In the above case, the function IDs are set for each of the license management units 1a, 2a and 3a with their priorities being assigned, but the user IDs for identifying the users may be set with their priorities being assigned. In this case, when the user inputs the user ID by operating the content usage device 1, 2, 3 or 4, or inserts an IC card storing the user ID into the content usage device 1, 2, 3 or 4, each of the license management units 1a, 2a and 3a accepts the commission from the content usage device operated by the user with a higher priority.

The searcher X searches for the license management unit that holds the desired license information according to various search methods such as the above-mentioned broadcast method, and requests the license management unit to transfer that license information. Meanwhile, the license management unit that is requested the license information authenticates the searcher X, and only if it determines that the searcher X is authorized, it permits the searcher X to acquire the license information that it holds itself so as to send the requested license information to the searcher X.

However, when the searcher X searches for the license management unit that holds the desired license information, it is very wasteful processing to search all the license management units including those which do not permit the searcher itself to acquire the license information and those which the searcher itself cannot access. It is wasteful processing because the searcher X cannot acquire the license information if it is determined to be unauthorized as a result of the authentication by the license management unit that meets the search condition, even if it is found as a result of the search.

In other words, it is desirable to omit in advance the license management units that do not permit the searcher X to acquire the license information and cannot be accessed by the searcher X from the search by the searcher X.

So, the searcher X may memorize search group information including the function unit IDs of the license management units that can be accessed and permit the searcher X to acquire the license information, etc.

In this case, when the searcher X searches for the license management units that hold the desired license information, it first refers to the search group information, and then searches for only the license management units registered in the search group information.

Accordingly, wasteful search can be prevented, such that the license information cannot be acquired from the license management unit that meets the search condition even if it is found as a result of the search by the searcher X.

In the above case, the searcher X memorizes the search group information, and thereby the wasteful processing is omitted. However, a search condition such as the license management units that can be accessed by the searcher X and permit the searcher X to acquire the license information may be added to the search condition such as the license management units that hold the desired license information. Thereby, the wasteful processing can be omitted, as in the case of memorizing the search group information in the searcher X.

Next, the authentication (Processing Ss2) in Step 102 as shown in FIG. 3 will be explained below.

According to the present embodiment, when the license management unit is requested the license information by any of the function units, it always authenticates the function unit to determine whether it is authorized or not.

When the license management unit 1a as the searcher X requests the license management unit 2a to transfer the license information, the license management unit 2a authenticates the license management unit 1a. Also, when the content output unit 1b requests the license management unit 1a to transfer the license information, the license management unit 1a authenticates the content output unit 1b.

Here, the license management unit that receives the request of the license information authenticates that requests the license information by confirming the user domain and the usage restriction of the function unit that requests it.

A user domain is a range in which license information can be moved. In the present embodiment, the user domain is set so that all the function units, that is, the license management units 1a, 2a and 3a and the content output units 1b, 2b, 3b and 4b belong to the identical user domain. That is, it is set so that the license information can be moved to any of the license management units 1a, 2a and 3a and the content output units 1b, 2b, 3b and 4b.

There are two kinds of user domains. One is set by a user for privacy protection, and another is set by a content provider such as a company that holds and provides the content. (Hereinafter, the former is referred to as just "user domain" and the latter as "content provider domain"). The content provider may further limit the content usage devices that belong to a predetermined content provider domain and further a range in which the license information can be moved to each other among these function units by setting a number of chains of moving of the license information.

Also, the usage restriction is to restrict particularly the function units that are permitted to acquire the license information that each of the license management units 1a, 2a and 3a holds among the plurality of the function units that belong to the identical user domain.

In other words, the license management unit that receives the request of the license information determines whether the function unit that requests the license information belongs to the identical user domain or not, and further determines whether it belongs to the usage restriction or not. Further, the license management unit that receives the request judges that the function unit that requests the license information is authorized only when the user domain of the function unit is identical to that of its own and the function unit is under the usage restriction, and permits the function unit to acquire the license information that the license management unit itself holds.

Note that this usage restriction may be set hierarchically. For example, under a usage restriction that is set by service type, a usage restriction may further be set by content category, and under the usage restriction, a usage restriction may further be set by content.

As described above, by authenticating the function unit that requests the license information using the user domain, the license information can be prevented from being drained to other terminal device located outside the identical home network 300. At the same time, by authenticating the function unit that requests the license information using the usage restriction, the function units can be classified to those which can acquire the license information and those which cannot acquire it, even if they are the function units of the content usage devices located in the home network 300.

For example, even if someone connects an unauthorized terminal device located outside of the home network 300 to the home network 300 to acquire license information, they cannot acquire the license information because the terminal device does not belong to the identical user domain. Also, if different usage restrictions are put on a content usage device 1 for a father's usage and a content usage device 2 for his son's usage within the home network 300, these content usage devices can be classified so that the son cannot acquire the license information on the content usage device 2 though his father can acquire it on the content usage device 1.

Once receiving the request of the license information, the license management unit may authenticate the function unit that requests the license information according to SSL (Secure Sockets Layer) using a certificate pursuant to X.509 Protocol issued by CA (Certificate Authority), for instance, before it authenticates using the user domain and the usage restriction. In the above case, the license management unit that is requested the license information only authenticates the function unit that requests it using the user domain and the usage restriction and the SSL. However, both the license management unit and the function unit may authenticate each other.

Next, how each of the license management units 1a, 2a and 3a determines whether the searcher X that requests the license information belongs to the user domain that is identical to the user domain to which each of the license management units 1a, 2a and 3a belongs according to a domain list method in the authentication (Processing Ss2) in Step S102 as shown in FIG. 3 will be explained below.

According to the domain list method, each of the license management units 1a, 2a and 3a holds a domain list in which the function IDs of the function units of the content usage devices that belong to the user domain identical to that of its own. When the searcher X requests it to acquire license information, it determines that the searcher X belongs to the user domain identical to that of its own if the function unit ID of the searcher X is registered in the domain list with reference to the list. When the function unit other than the license management unit 1a, 2a and 3a and the content output units 1b, 2b, 3b and 4b as the searcher X requests the license management unit 1a to acquire the license information, the license management unit 1a determines that the searcher X does not belong to the user domain identical to that of its own because the function unit ID of the searcher X is not registered in the domain list that it holds itself with reference to the domain list.

This domain list is prepared manually by a user at his own risk, by inputting the function unit IDs directly into the license management units 1a, 2a and 3a of each content usage device 1, 2 and 3, or by inputting the function unit IDs indirectly into the license management units 1a, 2a and 3a through the server 100 by communicating it using another terminal device. Also, this domain list is freely edited and renewed by the user himself, but it is prevented from being edited and renewed by another person than the user using an editing password, for instance.

When the home network is constructed by a plurality of content usage devices and their function units, the license management unit of each content usage device itself collects the function unit IDs of the function units of other content usage devices up to a predetermined number of IDs via the network, and thereby the domain list may be prepared.

In this case, the user need not input data such as the function unit ID into every license management unit of each content usage device, and therefore usability can be improved.

Here, how to renew the domain list when a new content usage device is connected to the home network including a plurality of the existing content usage devices that belong to the identical user domain will be explained below.

First, any one of the existing content usage devices is selected, and the new content usage device is connected to the selected content usage device.

Then, the function unit IDs of the function units of the new content usage device are registered in the domain list held by the license management unit of the selected existing content usage device, and further, the function unit IDs of the function units of the selected existing content usage device are registered in the domain list held by the license management unit of the new content usage device.

As a result, the selected content usage device and the new content usage device belong to the identical user domain. However, at this stage, the existing content usage devices other than the selected one and the new content usage device belong to different user domains.

Next, when each function unit in a plurality of content usage devices including the new content usage device moves license information between the other function unit belonging to the identical user domain, it passes the domain list that it holds itself to each other, and merges the received domain list into that of its own.

As a result, all the license management units of the existing content usage devices register the function unit IDs of the function units of the new content usage device in the domain lists that they hold themselves to renew them, and thereby, all the function units of the existing content usage devices and the new content usage device belong to the identical user domain.

An example of how to renew the domain list will be explained below.

FIG. 14A~FIG. 14E are descriptive diagrams for explaining how a new content usage device including a license management unit 5a, which is connected to the home network 300 as shown in FIG. 1 and FIG. 2, operates to renew the domain lists of the license management units 1a, 2a, 3a and 5a, respectively. In FIG. 14A~FIG. 14E, a spotlight is turned on the domain lists held by the license management units of the content usage devices, while the content output units are omitted.

Figure 14A:
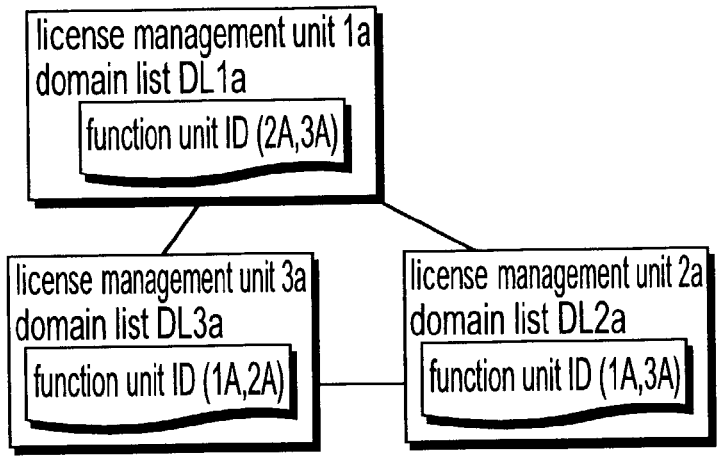
FIG. 14A~FIG. 14E are descriptive diagrams that show samples of operations for renewing a domain list.

As shown in FIG. 14A, function unit IDs 2A, 3A of the license management units 2a, 3a are registered in a domain list DL1a held by the license management unit 1a of the content usage device 1, function unit IDs 1A, 3A of the license management units 1a, 3a are registered in a domain list DL2a held by the license management unit 2a of the content usage device 2, and function unit IDs 1A, 2A of the license management units 1a, 2a are registered in a domain list DL3a held by the license management unit 3a of the content usage device 3. All of the license management units 1a, 2a and 3a belong to the identical user domains.

Figure 14B:
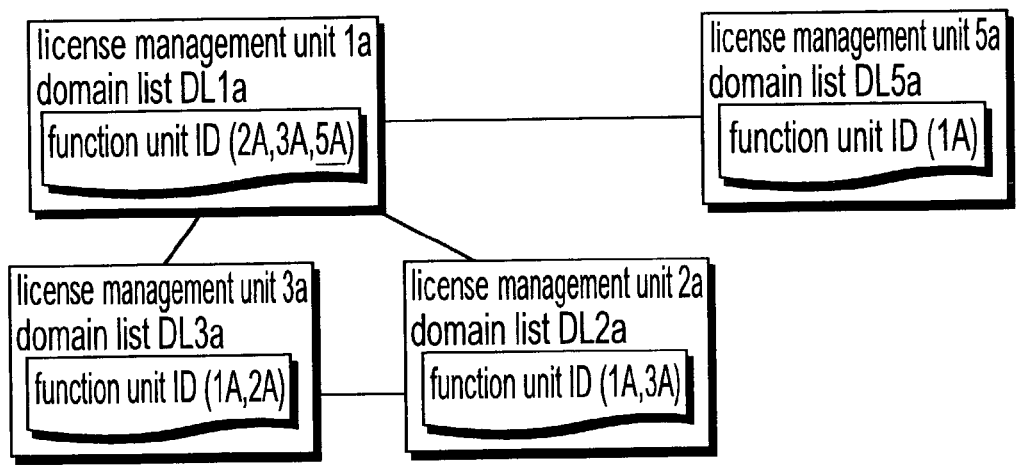

Next, as shown in FIG. 14B, a user selects the content usage device 1, connects a new content usage device to the content usage device 1, and registers a function unit ID "5A" of the license management unit 5a of the new content usage device in the domain list DL1a held by the license management unit 1a of the content usage device 1 so as to renew the domain list DL1a into "2A, 3A, 5A".

Also, the user inputs the function ID of the license management unit 1a in the license management unit 5a of the new content usage device so as to prepare a domain list DL 5a indicating "1A".

As a result, the license management unit 1a and the license management unit 5a, that is, the content usage device 1 and the new content usage device belong to the identical user domain, while the license management units 2a, 3a and the license management units 5a, that is, the content usage devices 2, 3 and the new content usage device belong to different user domain.

Here, when the license management unit 5a as the searcher X searches for the license management unit that holds the desired license information and requests the license management unit 1a to transfer the license information, the license management unit 1a judges that the license management unit 5a belongs to the user domain identical to that of its own because the function unit ID "5A" of the license management unit 5a that requests the license information is included in the domain lists "2A, 3A, 5A" that the license management unit 1a holds itself, and permits the license management unit 5a to acquire the license information.

Figure 14C:
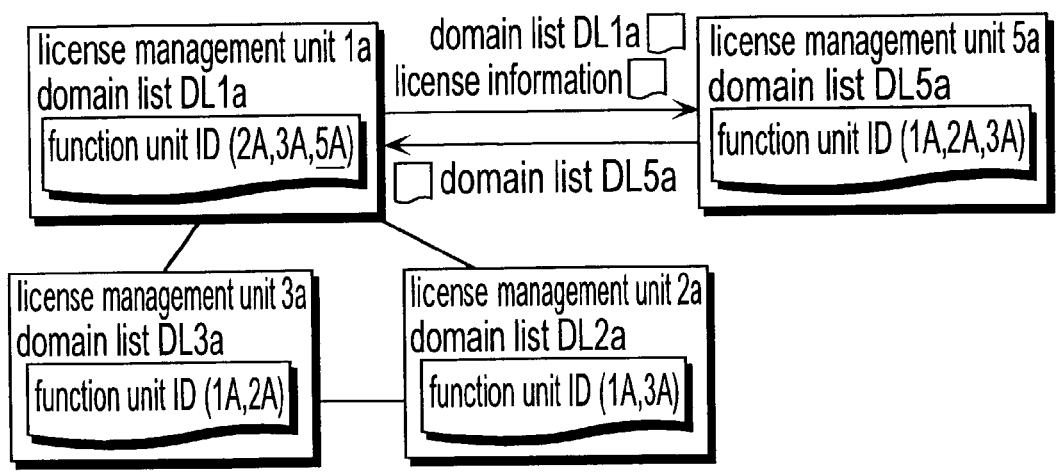

As a result, as shown in FIG. 14C, the license information is moved from the license management unit 1a to the license management unit 5a. At this time, the license management unit 1a sends the domain list DL1a "2A, 3A, 5A" that it holds itself to the license management unit 5a, and the license management unit 5a sends the domain list DL5a "1A" that it holds itself to the license management unit 1a. And the license management units 1a, 5a respectively merge their own domain lists with each other, and the license management unit 5a renews the domain list DL5a of its own to "1A, 2A, 3A".

Figure 14D:
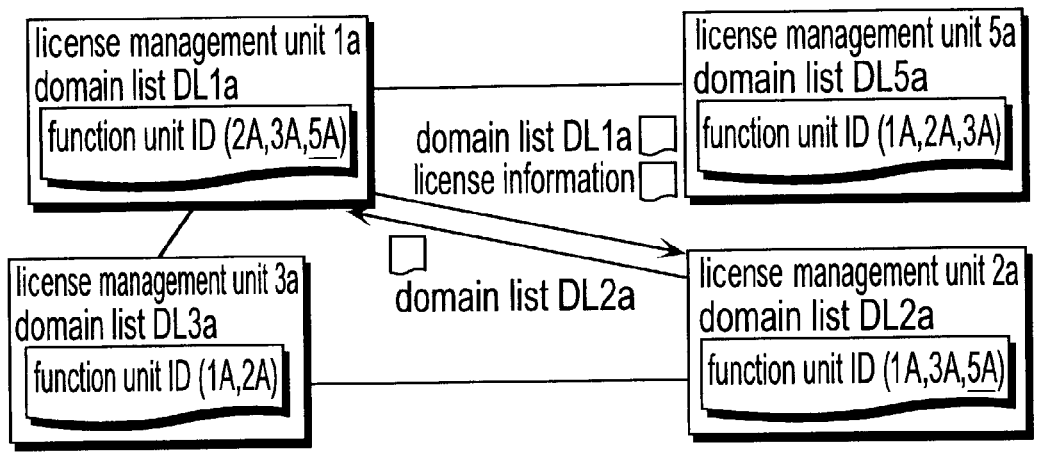

Next, as shown in FIG. 14D, when the license management unit 2a acquires the license information from the license management unit 1a, the license management unit 1a sends the domain list DL1a "2A, 3A, 5A" that its holds itself to the license management unit 2a, and the license management unit 2a sends the domain list DL2a "1A, 3A" that it holds itself to the license management unit 1a, as in the case of the above. Further, the license management units 1a, 2a respectively merge their own domain lists with each other, and the license management unit 2a renews the domain list DL2a of it own to "1A, 3A, 5A".

Figure 14E:
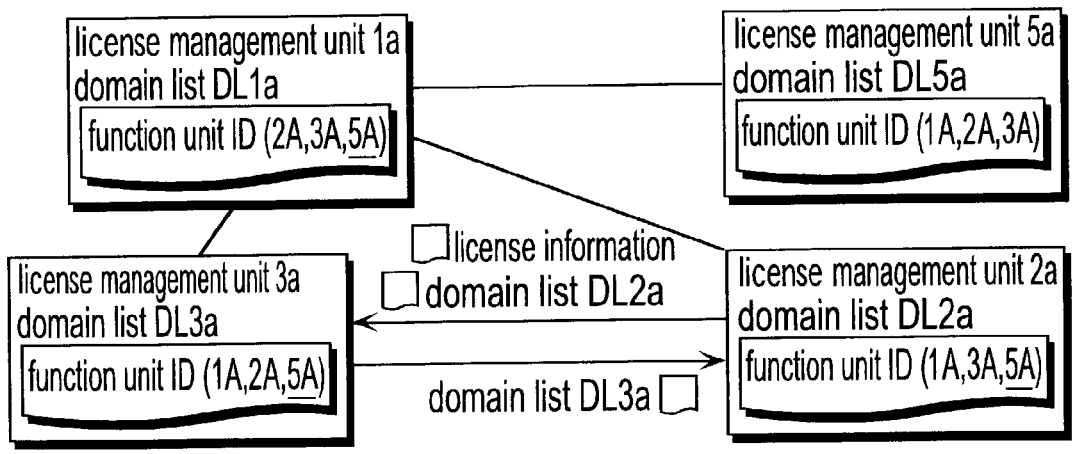

And finally, as shown in FIG. 14E, when the license management unit 3a acquires the license information from the license management unit 2a, the license management unit 3a sends the domain list DL3a "1A, 2A" that it holds itself to the license management unit 2a, and the license management unit 2a sends the domain list DL2a "1A, 3A, 5A" that it holds itself to the license management unit 3a, as in the case of the above. In addition, the license management units 2a, 3a respectively merge their own domain lists with each other, and the license management unit 3a renews the domain list DL3a of it own to "1A, 2A, 5A".

As a result, the user can renew the domain lists DL2a, DL3a of the license management units 2a, 3a without renewing them manually, and can make the license management units 1a, 2a, 3a and 5a on the home network 300, that is, the content usage devices 1, 2 and 3 and the new content usage device belong to the identical user domain.

In the above case, a plurality of license management units of the content usage devices send their own domain lists with one another and merge their domain lists with the others' so as to renew their own domain lists. However, a domain list management terminal for renewing the domain list of the license management unit of each content usage devices may further be provided on the home network 300.

The function unit IDs of the function units of a plurality of the content usage devices that belong to the identical user domain are registered in this domain list management terminal. When a new content usage device is provided, the function unit IDs of the function units of the new content usage device are additionally registered in the domain list management terminal.

And the license management unit of each content usage device accesses the domain list management terminal on a regular basis or every time it performs a predetermined processing, and registers the latest function unit IDs registered in the domain list management terminal in the domain list held by the license management unit itself so as to renew it.

For example, in the above-mentioned case, the function unit IDs "1A, 2A, 3A" are registered in advance in the domain list management terminal. When the new content usage device is connected to LAN on the home network 300, the function unit ID "5A" of the license management unit 5a of the new content usage device is additionally registered in the domain list management terminal.

And each function unit such as the license management unit 1a, 2a and 5a accesses the domain list management terminal on a regular basis, and registers the latest function unit IDs "1A, 2A, 3A, 5A" registered in the domain list management terminal in the domain list held by the function unit itself.

In the above case, only the function IDs are registered in the domain list, but the user IDs for identifying users may be registered in advance in association with the function unit IDs.

In this case, when the user inputs the user ID by operating the content usage device, the user domain is formed by the function units registered in the domain list in association with the user ID, and a range of the user domain can be changed according to each user. For example, when a user u1 inputs his own user ID "U1" in the content usage device 1, the user domains are formed by all of the license management units 1a, 2, and 3a and the content output units 1b, 2b, 3b and 4b of the content usage devices 1, 2, 3 and 4. On the other hand, when a user u2 inputs his own user ID "U2" in the content usage device 1, the user domains are formed by the license management units 1a and 2a and the content output units 1b and 2b of the content usage devices 1 and 2.

When the user domain is replaced with the content provider domain, the server 100 distributes the domain list by secure communication, or an agent or a serviceman dedicated to the content provider directly operates the content usage devices 1~3, and thereby the domain list is registered in the license management units 1a, 2a and 3a of the content usage devices 1, 2 and 3. Also, when the domain lists registered in the license management units 1a, 2a and 3a as described above are renewed, the server 100 distributes the latest domain list by secure communication in response to the inquiry from the license management units 1a, 2a and 3a, or the specialized agent or the serviceman directly edits the domain list. The details of the domain list are prevented from being modified by the user in this manner. Also, the domain list may be merged so as to be renewed, as described above.

Next, how the license management units 1a, 2a and 3a determine whether the searcher X that requests the license information belongs to the user domain identical to those to which the license management units belong pursuant to the password method in the authentication processing (Processing Ss2) in Step S102 as shown in FIG. 3 will be explained below.

According to this password method, each of the license management units 1a, 2a and 3a and the content output units 1b, 2b, 3b and 4b that belong to the identical user domain holds the identical password (common information). When each of the license management units 1a, 2a and 3a receives the request to acquire the license information from the searcher X, it collates the password of the searcher X with that of its own, and if the passwords match each other, it determines that the searcher X belongs to the user domain identical to its own user domain.

For example, when a device other than the license management units 1a, 2a and 3a and the content output units 1b, 2b, 3b and 4b as a searcher X requests the license management unit 1a to acquire the license information, the license management unit 1a determines that the searcher X does not belong to the user domain identical to its own user domain because its password does not match the password of the searcher X.

This password is inputted by a user and held by each function unit of the license management units 1a, 2a and 3a and the content output units 1b, 2b, 3b and 4b of the content usage devices 1~4. Note that a password management terminal for managing a password per user domain may be provided on the home network 300. In this case, the password management terminal gives the identical password to each of a plurality of content usage devices that are to belong to the identical user domain.

Also, the function unit ID that is to be registered in the domain list is selected according to domain list method, or a plurality of passwords are held by the function unit of the content usage device according to the password method, and thereby each content usage device or each function unit of the content usage device may belong to a plurality of user domains.

Figure 15:
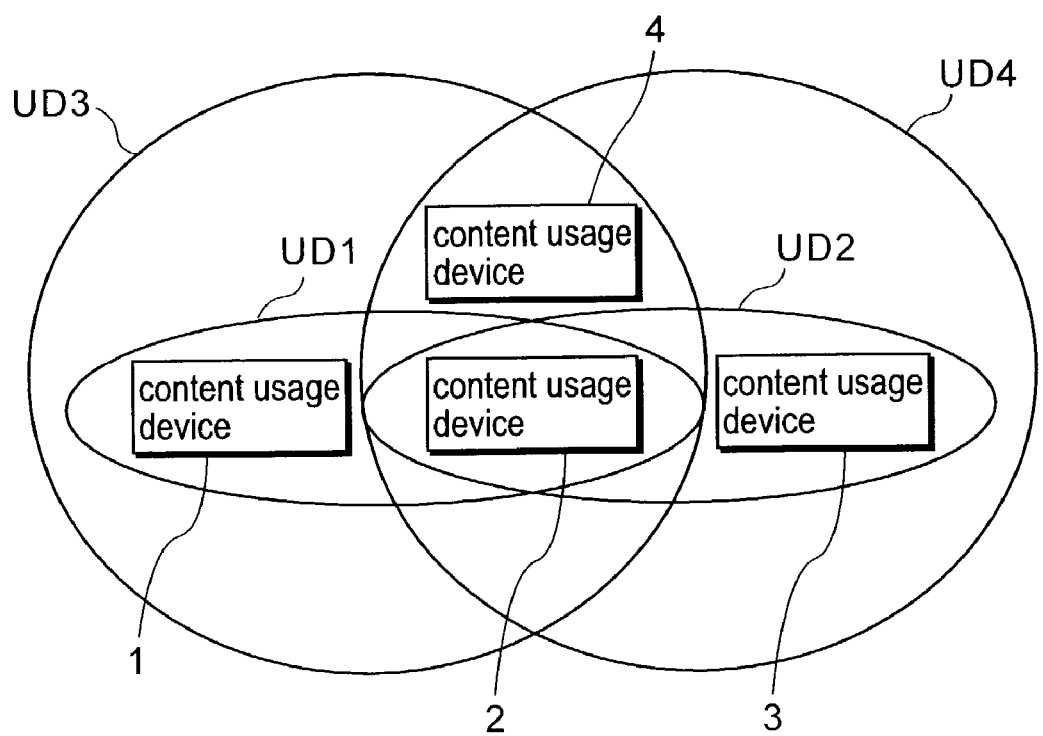
FIG. 15 is a descriptive diagram that shows a sample of how the content usage device are when they belong to a plurality of user domains.

FIG. 15 is a descriptive diagram that shows a sample of how the content usage devices are if they belong to a plurality of user domains.

In this sample, it is configured so that the content usage device 1 belongs to the user domains UD1, UD3, the content usage device 2 belongs to the user domains UD1, UD2, UD3, UD4, the content usage device 3 belongs to the user domain UD2, UD4, and the content usage device 4 belongs to the user domain UD3, UD4.

In this case, the content usage device 1 can move the license information between itself and the content usage devices 2 and 4 respectively, the content usage device 2 can move the license information between itself and the content usage devices 1, 3 and 4 respectively, and the content usage device 3 can move the license information between itself and the content usage devices 2 and 4 respectively.

Note that, when one content usage device belongs to a plurality of user domains, the content usage device may hold information notifying which user domain should be a higher priority by setting a flag, for instance.

Next, the usage restriction that is confirmed along with the user domain in the authentication processing (Processing Ss2) in Step S102 as shown in FIG. 3 will be explained below.

As mentioned above, when each of the license management units 1a, 2a and 3a receives the request to acquire the license information from the searcher X, it determines whether the searcher X belongs to the identical user domain or not, and also determines the usage restriction on the searcher X such as whether the requested license information may be passed to the searcher X or not.

This usage restriction is determined by the group information including predetermined data stored in each of the license management units 1a, 2a and 3a. In this group information, a function unit ID of a function unit that is permitted to acquire license information and a user ID of a user, a function unit ID of a function unit that the license management units 1a, 2a and 3a trust and a user ID, a function unit ID of a function unit that is permitted to acquire license information per license information, that is, per content or service to be used, or a function ID of a function unit that is permitted to acquire license information per processing type are registered.

First, the case when the function unit ID of the function unit that is permitted to acquire the license information is registered in the group information will be explained.

For example, when the content output unit 2b with the function unit ID "2B" as a searcher X requests the license management unit 1a to transfer the license information, the license management unit 1a determines that the searcher X belongs to the user domain identical to that of its own pursuant to the domain list method or the password method, and then determines whether the function unit ID "2B" is included in the group information stored in itself or not with reference to the group information. If the function ID "2B" is included in the group information, the license management unit 1a authenticates the content output unit 2b that is the searcher X as authorized, and permits it to acquire the license information.

In this manner, by setting the usage restriction, a plurality of content usage devices that belong to the identical user domain can be classified into those that can acquire the license information to use a content and those that cannot acquire the license information nor use the content.

In the above case, the function unit IDs of the function units of the content usage devices that are permitted to acquire the license information are registered in the group information, but the user IDs of the users who are permitted to use the license information may be registered there.

In this case, when a user inputs his user ID in any of the content usage devices 1~4 and the license management unit or the content output unit of the content usage device in which the user ID is inputted as a searcher X requests the license management unit that holds the license information to transfer that license information, the searcher X presents the user ID inputted by the user to that license management unit. The license management unit that receives the request of the license information determines whether the presented user ID is registered in the group information stored in itself or not, and if the user ID is registered, it permits the searcher X to acquire the license information.

Next, the case when the function unit IDs of the function units that the license management units 1a, 2a and 3a trust are registered in the group information will be explained.

For example, when the license management unit 1a trusts license management unit 2a and the license management unit 2a trusts the license management unit 3a, the function unit ID "2A" of the license management unit 2a is registered in the group information of the license management unit 1a, and the function unit ID "3A" of the license management unit 3a is registered in the group information of the license management unit 2a.

Here, since the license management unit 1a trusts the license management unit 2a, the license management unit 1a permits the license management unit 2a to acquire the license information that the license management unit 1a itself holds, and also permits the function unit of the content usage device approved by the license management unit 2a to acquire the license information. That is, since the license management unit 2a trusts the license management unit 3a, the license management unit 3a can acquire the license information from the license management unit 1a with the approval of the license management unit 2a.

More specifically, when the license management unit 3a acquires the license information from the license management unit 1a, the license management unit 3a first commissions the license management unit 2a to issue a certificate indicating its approval, and presents the certificate obtained from the license management unit 2a to the license management unit 1a so as to request it to acquire the license information. Here, the certificate includes reliability certification information indicating that "the license management unit 3a is trusted by the license management unit 2a".

Then, the license management unit 1a that receives the request of the license information refers to the group information stored in itself. As a result of the reference, the license management unit 1a permits the license management unit 3a to acquire the license information based on the fact that the function unit ID "2A" of the license management unit 2a is included in the group information though the function unit ID "3A" of the license management unit 3a is not included there and the details of above-mentioned certificate.

Also, when the other function unit is trusted and approved by the license management unit 3a, the other function unit presents the certificate including information indicating that "it is trusted by the license management unit 3a" and the certificate including information indicating that "the license management unit 3a is trusted by the license management unit 2a", and thereby can acquire the license information from the license management unit 1a. In other words, the other function unit can acquire the license information if it presents the certificates of the chained relationships of trust.

In the above case, the license management unit 3a approved by the license management unit 2a acquires the license information directly from the license management unit 1a, but it may acquire the license information of the license management unit 1a indirectly via the license management unit 2a. That is, the license management unit 3a commissions the license management unit 2a to acquire the license information from the license management unit 1a, and then acquires the license information from the license management unit 2a that has acquired it under the commission.

Furthermore, in the above case, the function unit IDs of the function units, which belong to the user domain identical to that of the license management unit that holds the group information, and the license management unit that holds the group information trusts, are registered in the group information held by the license management units 1a, 2a and 3a. However, the function unit IDs of the function units that belong to a different user domain may also be registered there if they are trusted.

In this case, when each of the license management units 1a, 2a and 3a confirms the user domain of the function unit that requests the license information, it also refers to the group information. And when each of the license management units 1a, 2a and 3a judges that the license information is requested from the function unit having the function unit ID registered in its own group information, it handles the function unit as that belonging to the user domain identical to its own even if it judges that the function unit belongs to the different user domain.

Assume that the other license management unit than the license management units 1a, 2a and 3a that belong to the identical user domain, which belongs to a different user domain from that of the license management units 1a, 2a, and 3a, judges that the license management unit 1a meets the search condition as a result of the search according to the broadcast method or the search commission method, and requests the license management unit 1a to transfer the license information, for example. In such a case, if the function ID of the other license management unit is registered in the group information held by the license management unit 1a, even if the license management unit 1a judges that the other license management unit belongs to the user domain different from that of its own, the license management unit 1a judges that the other license management unit is authorized, and permits the other license management unit to acquire the license information.

However, if the trustful relationship chains as mentioned above, each of the license management units 1a, 2a and 3a may permit the searchers X that are all the function units belonging to the identical user domain to acquire the license information even though the usage restriction is put on them. Furthermore, if the function unit IDs of the function units belonging to the user domain different from that of its own are also registered in the group information as described above, all the devices in the world may possibly be permitted to acquire the license information.

So, a hop count that is a number of the above-mentioned chains may be limited. That is, if the number of approved chains is two or less, each of the license management units 1a, 2a and 3a may handle one or two approved chain(s) as effective one(s) and three or more as ineffective ones.

For example, when the searcher X presents the certificates indicating respectively that "the searcher X itself is trusted by the license management unit 4a", "the license management unit 4a is trusted by the license management units 3a", and "the license management unit 3a is trusted by the license management unit 2a" to request the license management unit 1a to transfer the license information, the license management unit 1*a* prohibits the searcher X from acquiring the license information because the number of approved chains is three.

As a result, the license management unit 1*a* is prevented from permitting all the function units belonging to the identical user domain to acquire the license information.

In the above case, only the function unit IDs of the function units that the license management units 1*a*, 2*a* and 3*a* trust are registered in the group information, but the user IDs may be registered there in association with these function unit IDs of the trusted function units.

In this case, the trustful relationship between each of the license management units 1*a*, 2*a* and 3*a* and the other function unit can be changed according to each user.

Next, the case when the function unit ID of the function unit that is permitted to acquire the license information is registered in the group information per detail of the license information, that is per content or service to be used, will be explained.

In this case, a content ID assigned to each content for identifying it and a service ID assigned to each service for identifying a service type such as a usage period or a number of uses of a content are registered in the group information in association with the function unit ID.

Furthermore, each of the license management units 1*a*, 2*a* and 3*a* recognizes the content ID or the service ID of the content corresponding to the license information based on the request of the license information from the searcher X.

As a result, when the content ID is registered in the group information, for example, each of the license management units 1*a*, 2*a* and 3*a* can change the function unit that is permitted to acquire the license information of its own according to each content. Also, when the service ID is registered in the group information, each of the license management units 1*a*, 2*a* and 3*a* can change the function unit that is permitted to acquire the license information of its own according to each service.

For example, the function unit ID "2A" of the license management unit 2*a* is registered in the group information of the license management unit 1*a* in association with a content ID "C1" of an entertainment content, and the function unit IDs "2A, 3A" of the license management units 2*a* and 3*a* are registered there in association with a content ID "C2" of an educational content.

In this case, when the license management unit 3*a* as a searcher X requests the license management unit 1*a* to transfer the license information of the educational content, the license management unit 1*a* recognizes the content ID "C2" of the content corresponding to the requested license information based on that license information. Then, the license management unit 1*a* refers to the group information of its own, and permits the license management unit 3*a* to acquire the license information because the function unit IDs "2A, 3A" are registered in the group information in association with the content ID "C2".

On the other hand, when the license management unit 3*a* requests the license management unit 1*a* to transfer the license information of the entertainment content, the license management unit 1*a* recognizes the content ID "C1" of the content corresponding to the requested license information based on the license information. Then, the license management unit 1*a* refers to the group information of its own, and prohibits the license management unit 3*a* to acquire the license information because only the function unit ID "2A" is registered in the group information in association with the content ID "C1".

In other words, if the requested license information is that of the educational content, then the license management unit 1*a* permits the license management units 2*a* and 3*a* to acquire that license information. However, if the requested license information is that of the entertainment content, the license management unit 1*a* can change the function unit that is permitted to acquire the license information according to each content, so that it permits only the license management unit 2*a* to acquire that license information.

Next, the case when the function unit ID of the function unit that is permitted to acquire the license information is registered in the group information per processing type will be explained.

In this case, a processing ID for identifying each processing type is assigned to each type of the processing that the searcher X performs and registered in the group information in association with the function unit ID.

If there is the license management unit that holds the desired license information with the result that the searcher X searches for such license management unit, the searcher X performs processing of acquiring the license information from that license management unit (hereinafter referred to as "right transfer processing"). If there is no such license management unit, then the searcher X performs processing of requesting the server 100 to distribute the license information to acquire it (hereinafter referred to as "distribution request processing").

Here, if the searcher X cannot request the server 100 directly to distribute the license information for acquisition by the searcher X, the searcher X searches for the license management unit that enables it to acquire the license information, commissions that license management unit to request the server 100 to distribute the license information, and acquires the license information, which is distributed to the license management unit from the server 100, from that license management unit.

Different processing IDs are assigned in the right transfer processing and the distribution request processing, and the processing IDs are registered in the group information of the license management units 1*a*, 2*a* and 3*a* in association with the function unit IDs. And then, each of the license management units 1*a*, 2*a* and 3*a* recognizes the processing ID based on the request from the searcher X.

For example, the function unit IDs "2A, 3A" of the license management units 2*a* and 3*a* are registered in the group information of the license management unit 1*a* in association with the processing ID "M1" of the right transfer processing, and the function unit ID "3A" of the function unit 3*a* is registered there in association with the processing ID "M2" of the distribution request processing.

In this case, when the content output unit 3*b* commissions the license management unit 3*a* to acquire the license information, and the license management unit 3*a* as a searcher X searches for other license management units that hold the license information and finds that the license management unit 1*a* meets the search condition, the license management unit 3*a* requests the license management unit 1*a* to transfer the license information in order to perform the right transfer processing for the license information. Thereby, the license management unit 1*a* recognizes the processing ID "M1" based on the details of that request, and refers to the group information of its own so as to confirm whether the function unit ID "3A" of the license management unit 3*a* is associated with the processing ID "M1" of the right transfer processing. As a result, the license management unit 1*a* permits the license management unit 3a to perform the right transfer processing because the function unit ID "3A" is associated with the processing ID "M1".

Also, if there is no license management unit that meets the search condition with the result that the license management unit 3a as a searcher X searches for other license management units that hold the license information, the license management unit 3a performs the distribution request processing. Here, if the license management unit 1a itself requests the server 100 to distribute the license information and can acquire the license information although the license management unit 3a itself cannot request the server 100 to distribute the license information for acquisition, the license management unit 3a finds out the license management unit 1a and commissions it to request the server 100 to distribute the license information. In response to this commission, the license management unit 1a recognizes the processing ID "M2" based on that commission, and refers to the group information of its own to confirm whether the function ID "3A" of the license management unit 3a is associated with the processing ID "M2" of the distribution request processing. As a result, the license management unit 1a permits the license management unit 3a to perform the distribution request processing because the function ID "3A" is associated with the processing ID "M2", and requests the server 100 to distribute the license information.

On the other hand, if there is no license management unit that meets the search condition with the result that the license management unit 2a as a searcher X searches for other license management units that hold the license information, than the license management unit 2a commissions the license management unit 1a to request the distribution of the license information, as in the case of the above. However, once receiving this commission, the license management unit 1a rejects the commission from the license management unit 2a because the function unit ID "2A" of the license management unit 2a is not associated with the processing ID "M2" of the distribution request processing of its own group information.

Note that a management terminal for managing the group information may further be provided on the home network 300, as in the case of the domain list of the user domains, and thereby the management terminal may manage the group information of the license management units 1a, 2a and 3a collectively. In this case, each of the license management units 1a, 2a and 3a can renew the group information into the latest one at any time by accessing the management terminal. Also, each of the license management units 1a, 2a and 3a may renew the group information by sending the group information to one another to merge its own group information with the other's.

Furthermore, the processing the searcher performs is not limited to the right transfer processing and the distribution request processing. It may perform purchase processing of purchasing license itself to use a content and having the server 100 generate licenser information corresponding to the license. In this purchase processing, the searcher X requests the server 100 directly to generate the licenser information, or if the searcher X itself cannot request, the searcher X has the license management unit that can request the server 100 directly to generate the licenser information request the server 100 to generate the licenser information.

Also, the user ID may be registered in the above-mentioned group information in association with the processing ID and the function unit ID.

In this case, when the user inputs his user ID in any of the content usage devices 1~4, each of the license management units 1a, 2a and 3a judges whether it should permit the searcher X to perform the processing or not depending upon the processing type which the user and the searcher X are to perform, with reference to the group information.

For example, when the license management unit 1a is commissioned by the license management unit 2a as the searcher X to request the server 100 to distribute the license information in response to the user u1's operation, the license management unit 1a refers to the group information, and if the function unit ID "2A" of the license management unit 2a is registered in the group information in association with the user ID "U1" of the user u1 and the processing ID "M2" of the distribution request processing, it permits the license management unit 2a to perform the distribution request processing, and requests the server 100 to distribute the license information.

Next, the processing of acquiring the license information from the server 100 (Processing Ss4) in Step S102 as shown in FIG. 3 will be explained.

As described above, if there is no license management unit that meets the search condition with the result that the searcher X searches for the license management units that hold the desired license information, the searcher X performs the distribution request processing of requesting the server 100 to distribute the license information to acquire it. This distribution request processing corresponds to the processing of "the license management unit searches in advance and requests distribution" to acquire the license information in Processing Ss4 which is performed in Step S102 in FIG. 3.

Here, if the searcher X itself cannot request the server 100 directly to distribute the license information for acquisition, the searcher X searches for the license management unit that enables to, (i) commission that license management unit to request the server 100 to distribute the license information, and (ii) acquire the license information, which is distributed to the license management unit from the server 100, through the license management unit.

Figure 16:
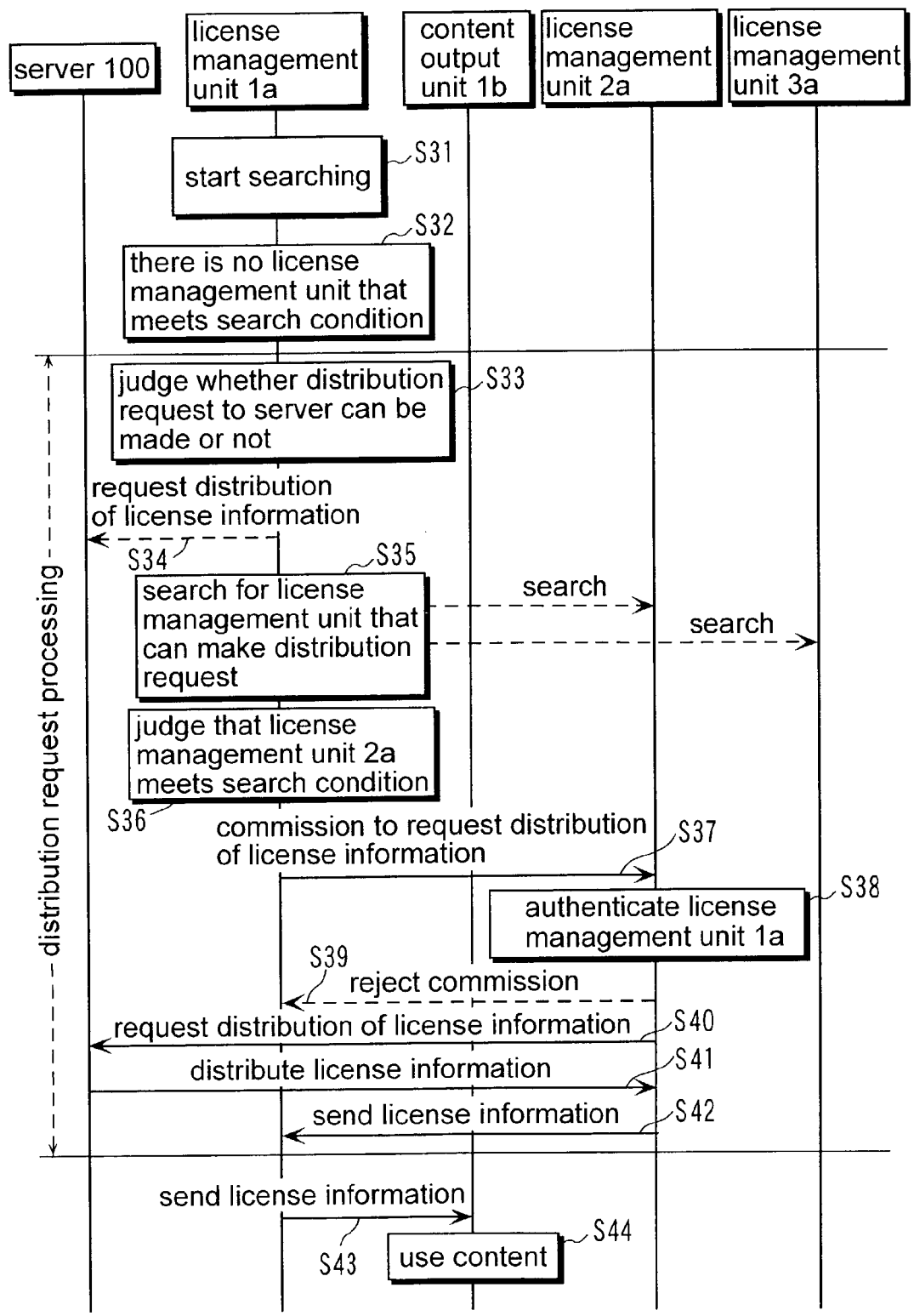
FIG. 16 is a sequence diagram that shows how the license management unit operates to perform distribution request processing.

FIG. 16 is a sequence diagram that shows how the license management unit operates to perform the distribution request processing.

The license management unit 1a searches for the other license management units that hold the license information requested by the content output unit 1b (Step S31). If the license management unit 1a determines that there is no license management unit that meets the search condition (Step S32), the license management unit 1a judges whether it can request the server 100 to distribute the license information and acquire the license information (Step S33).

Here, when the license management unit 1a judges that it can request the distribution of the license information, it does this (Step S34), and when it judges that it cannot do this, it searches for other license management units that can request the distribution of the license information and acquire the license information (Step S35).

As a result of the search, if the license management unit 1a judges that the license management unit 2a meets the search condition (Step S36), it commissions the license management unit 2a to request the server 100 to distribute the license information (Step S37).

In response to the commission, the license management unit 2a the license management unit 1a (Step S38), and if the license management unit 1a is unauthorized, it rejects the commission and notifies the license management unit 1a to that effect (Step S39). If the license management unit 1a is authorized, then the license management unit 2a accepts the commission and requests the server 100 to distribute the license information (Step S40).

Once receiving the request from the license management unit 2a, the server 100 distributes the requested license information to the license management unit 2a (Step S41). When the license management unit 2a receives that license information, it further sends the license information to the license management unit 1a (Step S42).

When the license management unit 1a acquires the license information, it sends the license information to the content output unit 1b that requests it (step S43). Then, the content output unit 1b uses a content using this license information (Step S44).

As described above, according to the present embodiment, the searcher X searches for the license management units that hold the desired license information, and if there is no license management unit that meets the search condition, then the license management unit 1a performs the distribution request processing. As a result, the searcher X does not request the server 100 to issue the license information even though there is the desired license information on the home network 300, and therefore, it is prevented from holding the overlapping license information on the home network 300.

In the above case, the license management unit 2a authenticates the license management unit 1a in Step S38. However, the license management unit 2a may authenticate the content output unit 1b that requests the license management unit 1a to transfer the license information, or both the license management unit 1a and the content output unit 1b.

Also, when the license management unit 2a requests the server 100 to distribute the license information in Step S40, the server 100 generates the license information based on the licenser information held by the user who requests the license information and distributes it. At this time, the server 100 may collate the user who requests the license information with the user who holds the licenser information.

More specifically, when the user purchases license for content usage, he notifies a content provider of his personal identification number, for instance, and when the content provider registers licenser information in the server 100 pursuant to the purchase of the license, it associates the licenser information with the personal identification number. When the user uses the content, he inputs his personal identification number by operating the content usage device 1 including the license management unit 1a and the content output unit 1b, and when the license management unit 2a requests the server 100 to distribute the license information in Step S40, it sends this personal identification number to the server 100. And the server 100 collates the user who requests the license information with the user who holds the licenser information based on this personal identification number.

In the above case, the user is collated based on the personal identification number. However, the user may be collated based on the identification information for identifying the user stored in an IC card. In this case, the licenser information is registered in the server 100 in association with the identification information, and the user makes the content usage device 1 read the identification information stored in the IC card and send it to the server 100. And the server 100 collates the identification information registered in itself with that sent from the license management unit 2a.

As described above, the server 100 collates the user, and thereby, it can generate the license information based on the licenser information that is held by an authorized user and distribute the license information to the user.

Furthermore, if there is no licenser information that enables the server 100 to generate the license information requested by the server 100, it sends distribution failure information notifying that it cannot distribute the requested license information and license purchase suggestion information urging the user to purchase the license of the content, to the license management unit 1a via the license management unit 2a. The user is informed from the distribution failure information that the server 100 will not distribute the license information, and judges whether he purchases the license of the content based on the license purchase suggestion information.

Here, when the user purchases a new license, he inputs the above personal identification number or identification information and purchase choice license information indicating a license type he wants to purchase in any of the content usage devices 1~3. Once the purchase choice license information and others are inputted in the content usage device, the license management unit of the content usage device sends the inputted information to the server 100, and the server 100 prepares the licenser information based on the sent information. Also, when the server 100 receives the purchase choice license information and judges that the license indicated by the licenser information it holds at that time overlaps the license indicated by the purchase choice license information, the server 100 sends overlapping purchase notice information notifying any of the content usage devices on the home network 300 that the user is about to purchase the overlapping license. Once receiving this overlapping purchase notice information, the content usage device notifies the user based on the overlapping purchase notice information that he is about to purchase the overlapping license.

As a result, the user is prevented from purchasing the overlapping license.

Next, the processing in which the "license management unit refers to license list in advance and requests distribution", and acquires the license information from the server 100 in Step S102 in FIG. 3 (Processing Ss4) will be explained below.

In this processing, each of the license management units 1a, 2a and 3a refers to the license list so as to recognize the license information held on the home network 300, and thereby, it is prevented to hold the overlapping license information on the home network 300.

In other words, each of the license management units 1a, 2a and 3a notifies the other license management units of the details of the passed license information when it receives the license information from the server 100 and it transfers the license information. Each of the license management units 1a, 2a and 3a prepares the license list in which the license information held on the home network 300 is registered based on the notified details of the license information. Then, if each of the license management units 1a, 2a and 3a does not hold this license information when it is requested the license information, it recognizes all the license information on the home network 300 with reference to the above license list, and if there is not the requested license information on the home network 300, it requests the server 100 to distribute the license information.

Figure 17:
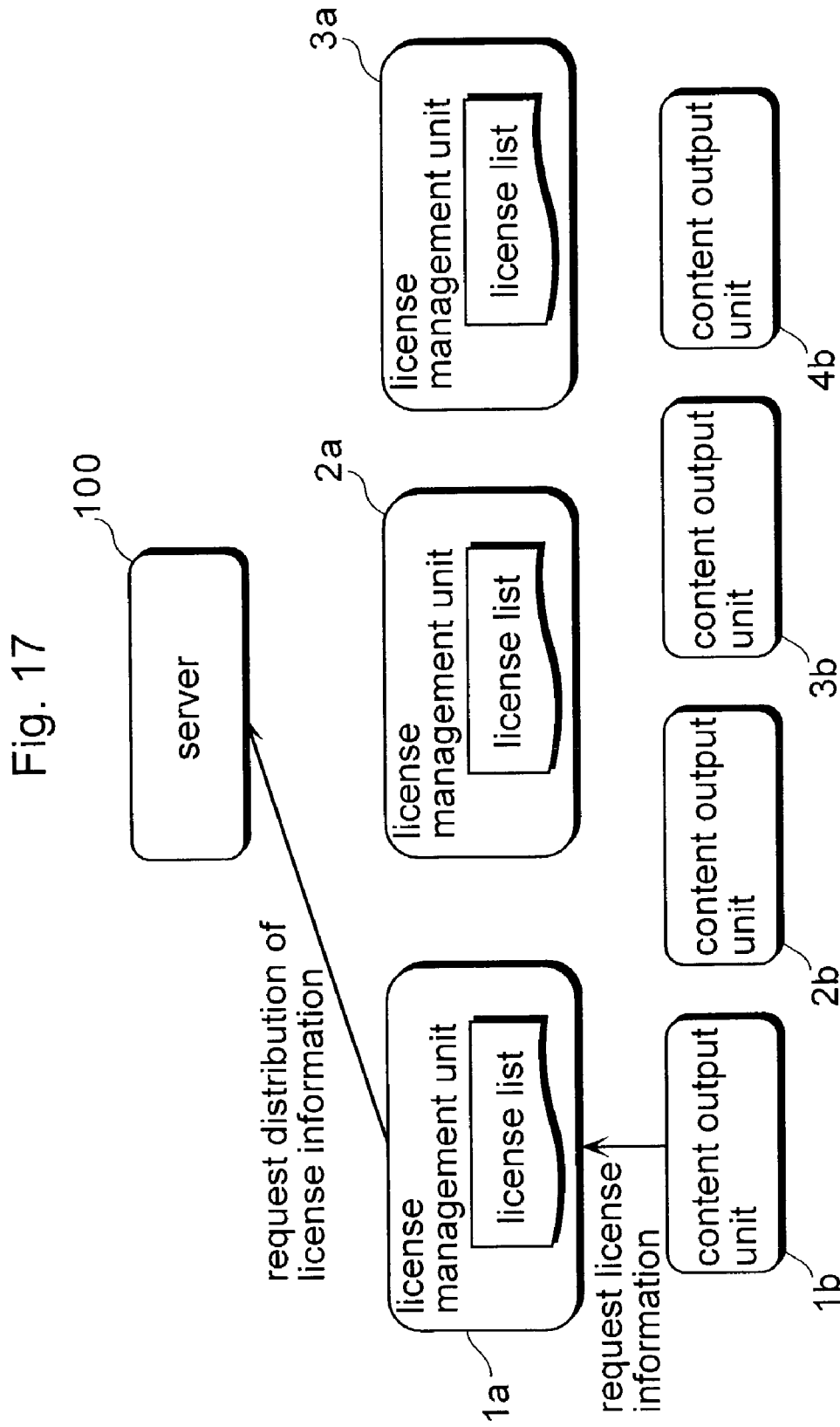
FIG. 17 is a descriptive diagram that shows a sample of how the license management unit operates to request the server to distribute the license information.

FIG. 17 is a descriptive diagram that shows a sample of how the license management unit 1a operates to request the server 100 to distribute the license information with reference to the license list.

As shown in FIG. 17, the content output unit 1b first requests the license management unit 1a to transfer the license information. At that time, if the requested license information is not in the license information of its own, the license management unit 1a determines whether there is the requested license information on the home network 300 or not with reference to the license list. If it determines that there is the license information on the home network 300, then the license management unit 1a requests the license management unit that holds that license information to transfer the license information for acquisition, and then sends the acquired license information to the content output unit 1b.

On the other hand, if the license management unit 1a determines that the requested license information is not on the home network 300, the license management unit 1a requests the server 100 to distribute the license information for acquisition, and sends the acquired license information to the content output unit 1b.

Next, the processing of acquiring the license information from the server 100 without requesting the distribution in Step S102 in FIG. 3 (Processing Ss4) will be explained below.

In this processing, the server 100 distributes the license information on a regular basis, for instance, regardless of whether there is a request to distribute the license information or not.

Figure 18:
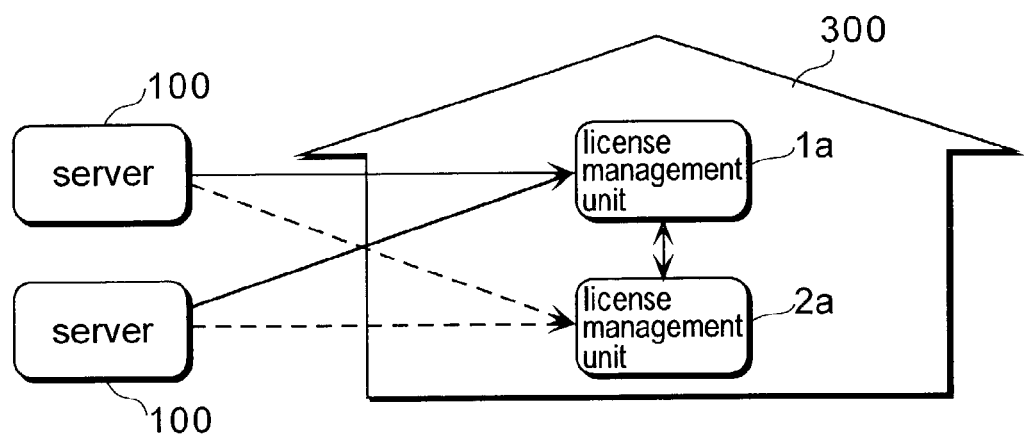
FIG. 18 is a descriptive diagram that shows how the servers distribute the license information.

FIG. 18 is a descriptive diagram that shows how two servers 100 distribute the license information to the license management units 1a and 2a, respectively. Note that the license management unit 3a and the content output units 1b, 2b, 3b, 4b, and the home gateway 200 are omitted in FIG. 18.

Each of the servers 100 regularly generates the license information based on the licenser information and distributes the license information to the license management units 1a and 2a. At this time, the server 100 selects the license management unit that is to be distributed the license information depending upon the details of the license information. In the case of the license information for a movie content, for instance, the server 100 selects the license management unit 1a to distribute the license information. In the case of the license information for a music content, the server 100 selects the license management unit 2a to distribute the license information. Here, each of the license management units 1a and 2a registers in advance distribution destination setting information, in which the details of the license information is associated with the units to be distributed that license information, in the server 100, and the server 100 selects the distribution destination of the license information based on the registered distribution destination setting information.

When each of the license management units 1a and 2a registers the distribution destination setting information in the server 100, the server 100 may limit the amount of the license information distributed to itself in order to prevent the amount of the license information it holds from exceeding a predetermined amount of information.

Next, the processing of the license information that is performed in Step S104 as shown in FIG. 3 will be explained below.

Here, the processing of the license information means the processing of the license information performed when any of the content output units 1b, 2b, 3b and 4b does not use up all the license included in the license information.

For example, the license management unit 1a that is a searcher X receives the request from the content output unit 1b, acquires the license information meaning that "only 10-time reproduction of a movie content is licensed", and sends it to the content output unit 1b that requests it.

When the content output unit 1b reproduces the content only once using the license information, it sends that license information and the usage information notifying that it is used only once to the license management unit 1a.

The license management unit 1a renews the license information sent from the content output unit 1b into the license information meaning that "only 9-time reproduction of a movie content is licensed" based on the usage information, and holds it.

Here, the license management unit 1a may keep holding the renewed license information, or may return it to the license management unit 2a from which the license management unit 1a acquires the original license information.

When the license management unit 1a returns the renewed license information to the license management unit 2a, it memorizes the acquisition source information indicating that the license information is acquired from the license management unit 2a, and returns the renewed license information based on the acquisition source information. This acquisition source information is a function unit ID stored in Step S1b as described in FIG. 10, for instance. It is stored in Step S9b without being deleted.

Furthermore, each of the license management units 1a, 2a and 3a may judge whether it keeps holding the renewed license information or returns it to the acquisition source, depending upon the details of the license information, for instance.

For example, even when the license management unit 1a keeps holding the license information acquired from the license management unit 2a, the license management unit 1a holds the above-mentioned acquisition source information. When the license information is requested from the license management unit 3a and the license information is sent, the license management unit 1a sends the license information and the acquisition source information to the license management unit 3a.

Once acquiring the license information and the acquisition source information, the license management unit 3a sends that license information to the content output unit 3b to have it used, and renews the acquisition source information into that indicating that the acquisition source is the license management unit 1a, for instance.

Here, when the content output unit 3b does not use up all of the license included in the license information, the license management unit 3a renews the license information as mentioned above, and then judges that the license management unit 3a should return the license information based on the details of it, and returns it to the license management unit 1a based on the acquisition source information. Note that, in the above case, the license management unit 3a renews the acquisition source information, but it may return the license information to the license management unit 2a without renewing the acquisition source information.

In the above case, the license management unit that has requested and acquired the license information determines whether it should keep holding or return the used and renewed license information. However, the license management unit as the acquisition source, that is, the license management unit that sends the license information in response to the request may instruct the license management unit that receives the license information to return the used and renewed one.

For example, in the sample as shown in FIG. 10, when the license management unit 2a that sends the license information prepares the sending information in Step S6b, it includes a return forcing message for forcing to the used and renewed license information to be returned to the license management unit 2a itself along with the license information in the sending information. This return forcing message is represented by setting a flag, for instance. Once receiving the sending information including the return forcing message and the license information, the searcher X renews this license information using a part of the received license information, and returns the renewed one to the license management unit 2a based on the return forcing message.

The case when the searcher X is a license management unit has been explained in the above, but when the searcher X is a content output unit, it always returns the used license information to the license management unit as the acquisition source.

For example, when the searcher X, which is the content output unit 1b, searches for the license management unit that holds the desired license information and the license management unit 2a meets the search condition, the content output unit 1b acquires the license information from the license management unit 2a and memorizes the acquisition source information.

After using the acquired license information, the content output unit 1b returns the usage information indicating how much license included in the license information has been used and the used license information to the license management unit 2a based on the acquisition source information.

By the way, the content usage device 3 and the content usage device 4 are out of the IP range of the home network 300, respectively. When they search for the license management units that hold the license information within the IP range, they searches indirectly via the content usage device within the IP range connected by a local line, without searching for the license management units directly.

Figure 19:
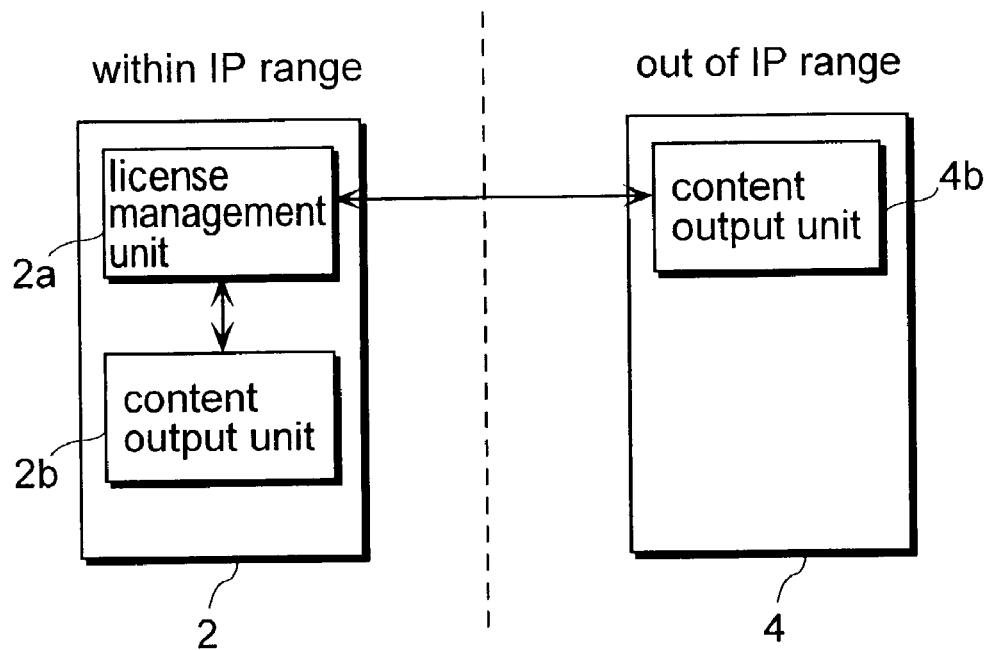
FIG. 19 is a descriptive diagram that shows how the content usage device out of the IP range commissions the content usage device within the IP range to search.

FIG. 19 is a descriptive diagram that shows how the content usage device 4 searches via the content usage device 2 connected by the local line.

When the content output unit 4b of the content usage device 4 as a searcher X searches for the license management units that hold the desired license information, the content output unit 4b commissions the license management unit 2a of the content usage device 2 within the IP range to search them. Upon receiving the commission, the license management unit 2a determines whether it holds that license information or not. If the license management unit 2a holds the license information, it interprets the details of the license information and sends the license information to the content output unit 4b. If it does not hold the license information, it searches on behalf of the content output unit 4b, interprets the details of the searched and acquired license information, and sends it to the content output unit 4b.

Then, the content output unit 4b acquires a necessary usage rule and a decryption key among the interpreted license information and uses the content.

As described above, even when the content usage device, not including the license management unit but the content output unit only in itself located out of the IP range, searches as the searcher X, it commissions the license management unit of the other content usage device within the IP range.

Figure 20:
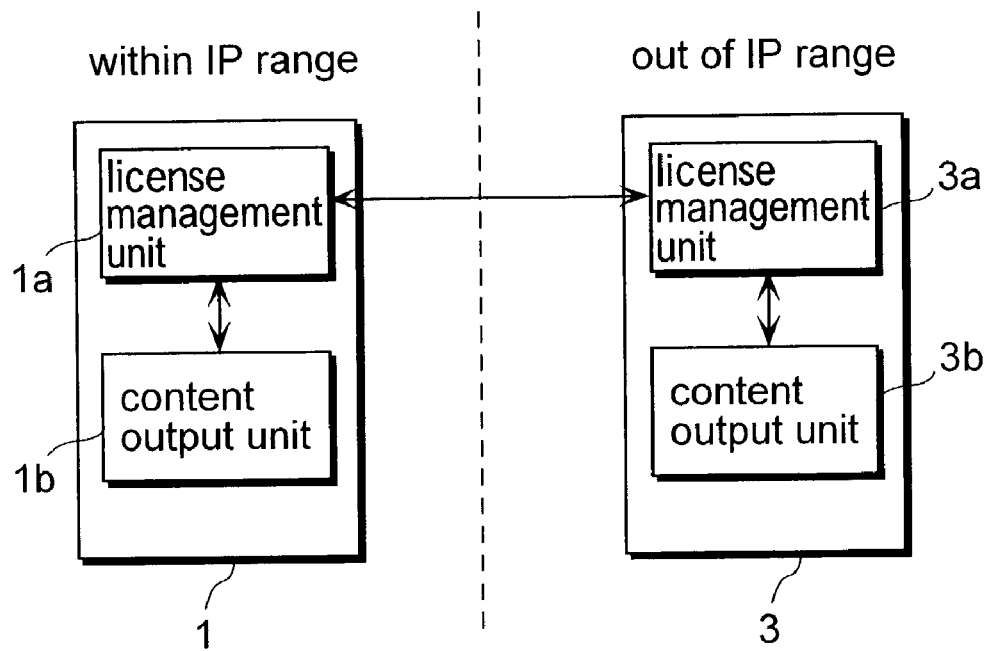
FIG. 20 is a descriptive diagram that shows another sample of how the content usage device out of the IP range commissions the content usage device within the IP range to search.

FIG. 20 is a descriptive diagram that shows how the content usage device 3 searches via the content usage device 1 connected by a local line.

When the content output unit 3b of the content usage device 3 as the searcher X searches for the license management units that hold the desired license information, it first searches for the license management unit 3a of the content usage device 3 that it can directly search and the license management unit 1a of the content usage device 1 connected by the local line. If none of the license management units 1a and 3a hold the license information, the content output unit 3b commissions the license management unit 1a within the IP range to search for the license management units that hold the desired license information.

The license management unit 1a searches on behalf of the content output unit 3b, acquires the license information from the license management unit that meets the search condition, and then sends that license information to the license management unit 3a of the content usage device 3. Upon receiving the license information, the license management unit 3a interprets the details of the license information and sends it to the content output unit 3b that requests it.

Also, when the license management unit 3a of the content usage device 3 becomes the searcher X in response to the request from the content output unit 3b, the license management unit 3a first determines whether it holds the license information requested from the content output unit 3b, and if it holds the license information, it interprets the details of the license information and sends the license information to the content output unit 3b. If the license management unit 3a does not hold the license information, the license management unit 3a commissions the license management unit 1a within the IP range to search for the license management units that hold the requested license information. Then, the license management unit 1a searches on behalf of the license management unit 3a.

As described above, the content usage device including the license management unit and the content output unit, located out of the IP range, commissions the license management unit within the IP range to search if it does not hold the desired license information. Upon receiving the commission, the license management unit located within the IP range makes only the search instead, and the license management unit located out of the IP range only interprets the details of the acquired license information. In summary, the license management units within and out of the IP range respectively perform the proxy search and the interpretation separately.

In the above case, the license management units within and out of the IP range perform the proxy search and the interpretation separately, but the license management unit within the IP range may perform both proxy search and interpretation. In this case, the license management unit out of the IP range relays information sent and received between the license management unit within the IP range and the content output unit out of the IP range.

In the case as shown in FIG. 20, for example, the license management unit 1a within the IP range performs both proxy search and interpretation, and the license management unit 3a out of the IP range relays the information sent and received between the license management unit 1a and the content output unit 3b.

Next, a variation of the home network 300 in the above embodiment will be explained below.

First, a variation of a number of content output units that are physically connected directly to the license management unit will be explained.

Figure 21:
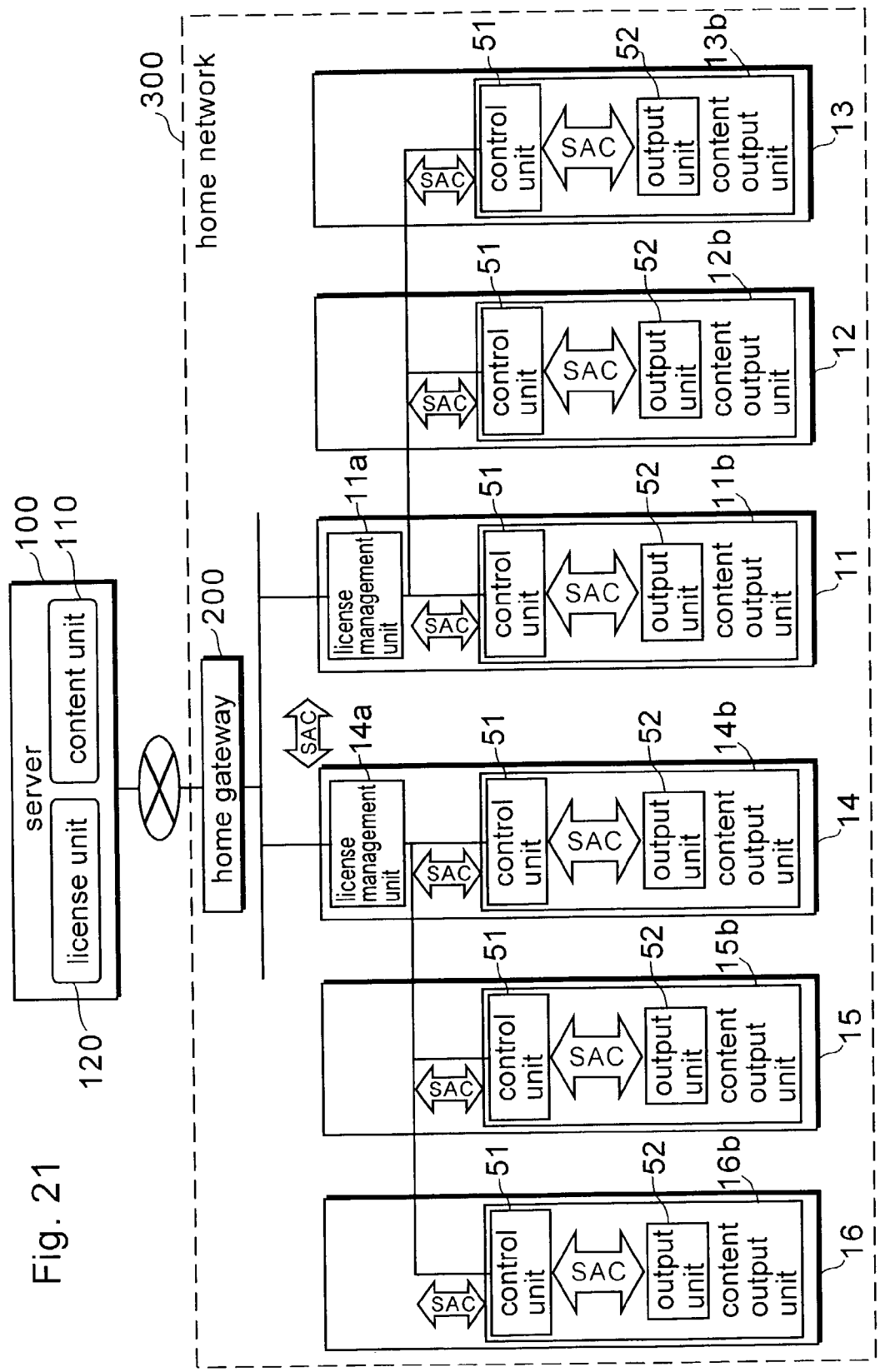
FIG. 21 is a functional block diagram of the entire system in which a plurality of content output units are connected directly to the license management unit.

FIG. 21 is a functional block diagram of the entire system including the home network 300 according to this variation. The home network 300 includes six content usage devices 11~16, and three content output units are physically connected directly to one license management unit.

The content usage device 11 includes a license management unit 11a having a same function as that of the license management unit 1a and a license management unit 11b having the same function as that of the content output unit 1b. Likewise, the content usage device 14 includes a license management unit 14a having the same function as that of the license management unit 1a and a license management unit 14b having the same function as that of the content output unit 1b.

On the other hand, the content usage devices 12, 13, 15 and 16 include content output units 12b, 13b, 15b and 16b having the same function as that of the content output unit 1b, respectively.

In this home network 300 including these devices 11~16, the content output unit 11b of the content usage device 11 itself, the content output unit 12b of the content usage device 12 and the content output unit 13b of the content usage device 13 are physically connected directly to the license management unit 11a of the content usage device 11. Likewise, the content output unit 14b of the content usage device 14 itself, the content output unit 15b of the content usage device 15 and the content output unit 16b of the content usage device 16 are physically connected directly to the license management unit 14a of the content usage device 14.

Here, assume that the home network 300 is configured as described above by physically connecting a plurality of content output units directly to one license management unit. When each of the license management units 11a and 14a searches for the license management units that hold the license information in response to the request from the content output units 11b~16b, the license management units 11a and 14a each memorize the function unit ID assigned to the content output unit that has made request. Further, each of the license management units 11a and 14a sends the searched and acquired license information, specifies the content output unit that has made the request based on the memorized function unit ID, and sends the license information to that content output unit.

Also, the operations in this variation performed when the content output units 11b~16b search for the license management units that hold the license information are same as those as shown in FIG. 2 performed when one content output unit is connected to one license management unit.

Control units 51 in the content output units 12b, 13b 15b and 16b of the content usage devices 12, 13, 15 and 16 function as a license information acquisition means for acquiring the license information from other content usage device, and output units 52 function as an output means for using a content in compliance with the acquired license information and outputting the content in at least one manner of sounds, videos and data.

As described above, even if the home network 300 as shown in FIG. 21 is configured by physically connecting a plurality of content output units directly to one license management unit, any of the content output units 11b~16b of the content usage devices 11~16 can use a content using the license information on the home network 300, as in the case when the home network 300 as shown in FIG. 2 by connecting one content output unit to one license management unit.

In this variation, three content output units are connected to one license management unit, but the present invention is not limited to this. Two or four or more content output units may be connected directly to one license management unit.

Next, a variation of plurality of license management units having different functions will be explained below.

Figure 22:
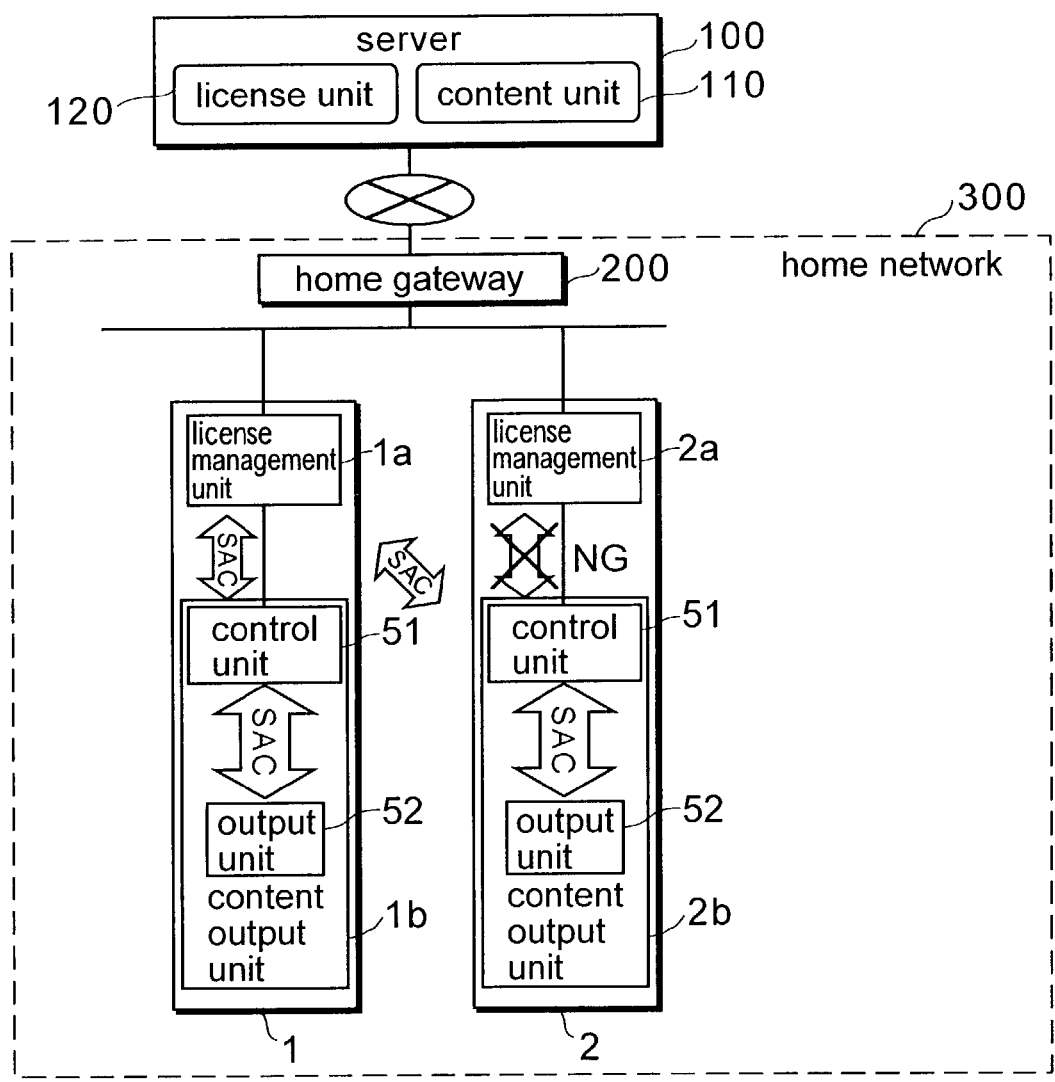
FIG. 22 is a functional block diagram of the entire system that shows how the system has one license management unit manage the license information collectively.

FIG. 22 is a functional block diagram of the entire system including the home network 300 according to this variation.

The home network 300 includes the content usage device land 2, and the license management unit 1a of the content usage device 1 manages the license information collectively, while the license management unit 2a of the content usage device 2 relays sending and receiving of data between the content output unit 2b and the server 100 and the license management unit 1a.

The content output units 1b and 2b always request the license management unit 1a to transfer the license information, and acquire the license information if the license management unit 1a holds that license information. Also, if the license management unit 1a does not hold the license information requested from the content output units 1a and 2a, then the license management unit 1a requests the server 100 to distribute that license information for acquisition, and sends the acquired license information to the content output units 1a and 2a.

As described above, even if one license management unit manages the license information collectively, any of the content output units 1b and 2b of the content usage device 1 and 2 can use a content using the license information on the home network 300, as in the case when each license management unit manages the license information separately. In other words, the content usage device 2 can acquire the license information from the content usage device 1 to use the content.

Furthermore, in this variation, the license management unit 2a manages the license information collectively under an abnormal condition that the license management unit 1a cannot manage the license information collectively.

In other words, both the license management units 1a and 2a have a function of managing the license information collectively and a function of relaying data sending/receiving. By searching the status of each other, either of these license management units manages the license information collectively, and the other license management unit relays the data sending/receiving.

As a result, even if the license management unit that manages the license information collectively is in an abnormal condition, the other one manages the license information collectively, and thereby, damages can be relatively reduced even in the abnormal condition.

Next, a variation of a umber of license management units will be explained.

Figure 23:
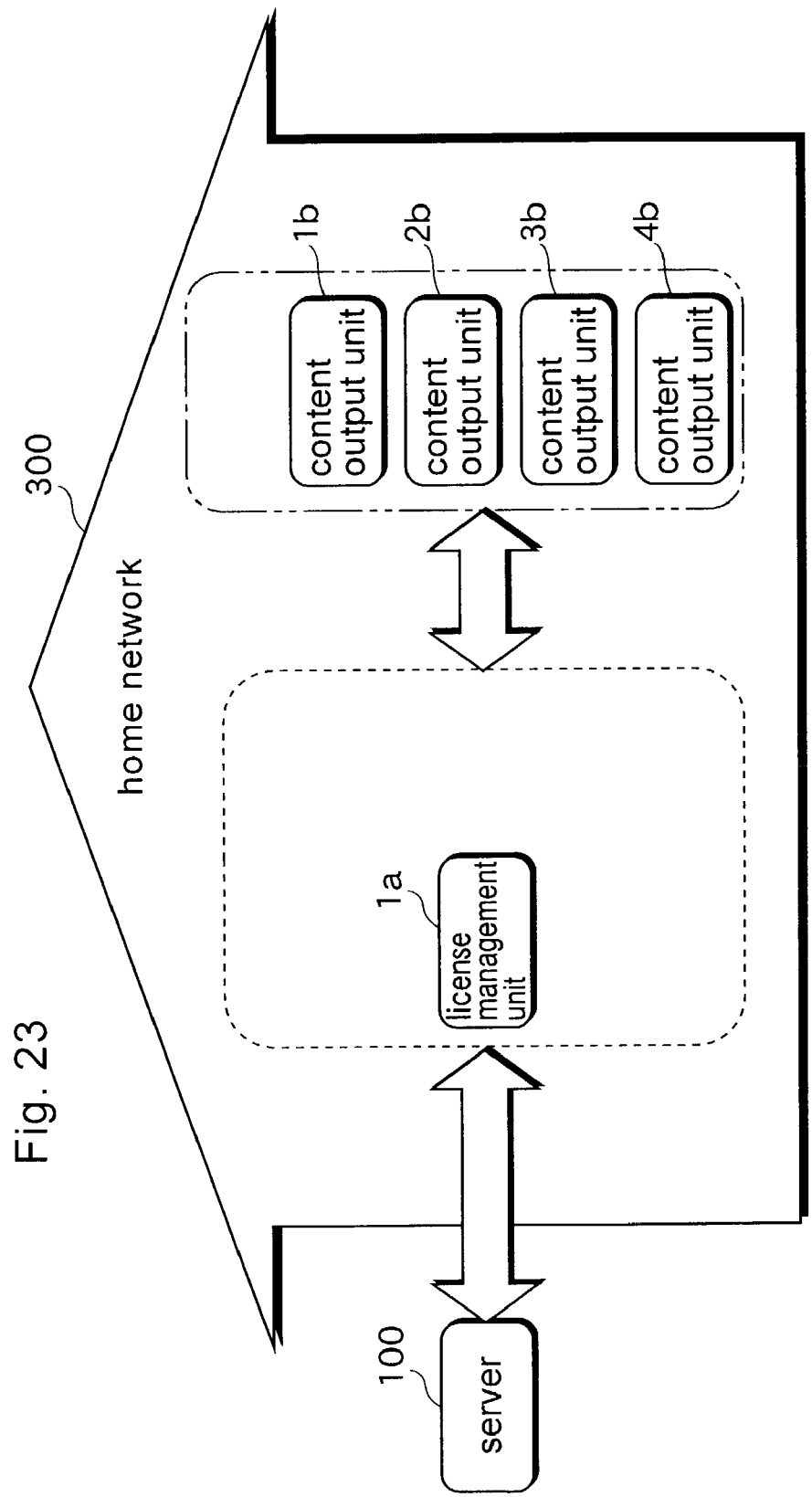
FIG. 23 is a schematic functional block diagram of the network system including one license management unit and a plurality of content output units.

FIG. 23 is a schematic functional block diagram of the network system including the home network 300 according to this variation.

The home network 300 includes the license management unit 1a, and the content output units 1b, 2b, 3b and 4b.

In the case of one license management unit like this, any of the content output units 1b, 2b, 3b and 4b requests the license management unit 1a to transfer the license information, and acquires it if the license management unit 1a holds that license information.

In this case, even if there is one license management unit, any of the content output units 1b, 2b, 3b and 4b can use a content using the license information on the home network 300. In other words, the content usage devices respectively including the content output units 2b, 3b and 4b can acquire the license information from the content usage device including the license management unit 1a and the content output unit 1b and use the content.

The network system according to the present invention has been explained using the embodiment and the variations thereof, but the present invention is not limited to these.

For example, in order to prevent loss of license information due to breakdown of the license management units 1a, 2a and 3a, the network system according to the present embodiment and the variations thereof, that is, the home network 300 may further include backup license management units that can be alternatives to the license management units 1a, 2a and 3a. In this case, every time the license management units 1a, 2a and 3a renew the license information that they hold, the license management units 1a, 2a and 3a authenticate the backup license management units and vice versa, and then have the backup license management units store the latest license information.

As a result, even if the license management units 1a, 2a or 3a break down, the backup license management unit operates instead of the broken down license management units to prevent the loss of the license information.

Furthermore, the home network 300 may include a content management unit including a storage unit that stores a content distributed from the content unit 110 of the server 100 so as to send the content stored in the storage unit in response to the request from the content output units 1b, 2b or 3b.

In this case, a content to be used is stored in advance in the storage unit of the content management unit. When the content output unit 1b, 2b or 3b actually uses the content, it requests the content management unit to distribute the content. The content management unit sends the content to the content output unit 1b, 2b or 3b if the requested content is stored in the storage unit, or requests the content unit 110 of the server 100 to distribute the content to acquire it if it is not stored in the storage unit, and sends it to the content output unit 1b, 2b or 3b.

As a result, there is no need to access the content unit 110 of the server 100 every time the content output units 1b, 2b or 3b uses the content, and therefore, it is possible to prevent occurrence of problems such that a content cannot be used when something abnormal occurs in communication between the server 100 and the home network 300. Also, the server 100 distributes a content and stores it in the storage unit of the content management unit during a light network load period such as midnight, and thereby the content can be easily used.

Also, the home network 300 according to the present embodiment and the variations thereof includes the content unit 110 and the license unit 120, and receives a content and license information distributed from the server 100. However, the home network 300 may receive a content from a server including the content unit 110 only, and receives license information from another server including the license unit 120 only. Furthermore, the home network 300 may receive a content distributed from a broadcasting station, and the content to be distributed may be encrypted by a package medium.

Also, in the present embodiment and the variations thereof, when the searcher X is any of the license management units 1a, 2a and 3a, and the content output units 1b, 2b, 3b and 4b request the license information, they respectively request a specific license management unit to transfer the license information first, but they may request a dynamically varied license management unit to transfer the license information first. For example, the content output unit 1b may request the license management unit 1a and the license management unit 2a to transfer the license information first alternately on a regular basis, or the content output unit 2b may request the license management unit 2a and the license management unit 1a to transfer the license information alternately on a regular basis.

Furthermore, the content output units 1a, 2a 3a and 4a respectively request the license information in the present embodiment and the variations thereof, but they may request reservations for acquiring the license information.

Here, requesting reservations for acquiring the license information means that each of the content output units 1b, 2b, 3b and 4b promises the license management unit that holds license information to be used in advance to acquire the license information and secure it to prevent the license information from being acquired by other function units.

When the content output unit 1b requests the license management unit 1a to reserve acquisition of the license information meaning that "only 10-time reproduction of a movie content is licensed", for example, the license management unit 1a holds the license information along with reservation information indicating that the content output unit 1b has reserved the license information if it holds that license information. This reservation information includes the function unit ID "1B" of the content output unit 1b that has reserved, for instance.

Next, when the content output unit 1b requests the license management unit 1a to transfer the license information meaning that "only 10-time reproduction of a movie content is licensed" in order to use it, the license management unit 1a sends the reserved license information to the content output unit 1b because the function ID "1B" of the content output unit 1b that has requested the license information matches the function unit ID "1B" included in the reservation information. As a result, the content output unit 1b acquires the reserved license information, and uses a content using the acquired reserved license information.

Also, even if the license management unit 2a requests the license management unit 1a to transfer the reserved license information before the content output unit 1b requests that license information, the license management unit 1a prohibits the license management unit 2a from acquiring the reserved license information because the function ID "2A" of the license management unit 2a that has requested the license information does not match the function unit ID "1B" included in the reserved license information.

As described above, the reserved license information can be acquired only by the function unit that has requested it. Therefore, if there is a plan to use license information, the content output unit 1b, 2b, 3b and 4b request reservations for acquiring the license information in advance, and thereby, the license information can be prevented from being acquired by other function units.

Also, in the above case, if the license management unit 1a does not hold the requested license information, the license management unit 1a may search for the license management units that hold the license information. In this case, if the license management unit 2a holds the license information as a result of the search, for example, the license management unit 1a requests the license management unit 2a to reserve acquisition of the license information so as to have it hold the requested license information along with the above reservation information.

In the above case, the function unit ID of the function unit that has reserved is included in the reservation information, and each function unit reserves the license information such that the content output unit 1b plans to use the license information A and the content output unit 2b plans to use the license information B. However, each user may reserve the license information.

For example, when the user u1 inputs the user ID "U1" by operating the content usage device 1 and has the content output unit 1b request a reservation for acquiring license information meaning that "only 10-time reproduction of a movie content is licensed", the license management unit 1a holds the license information along with the reservation information that the user u1 has reserved the license information if the license management unit 1a holds that license information. Here, this reservation information includes the user ID "U1" of the user u1 who has reserved, for instance.

Next, when the user u1 operates the content usage device 2 to use a content under a usage rule that a movie content is reproduced only 10 times on the content usage device 2 and inputs the user ID "U1" of the user u1 himself on the content usage device 2, the content output unit 2b requests the license management unit 2a to transfer the license information meaning that "only 10-time reproduction of a movie content is licensed". In response to the request, the license management unit 2a searches for the license management units that hold the license information if the license management 2a does not hold the license information. When the license management and unit 2a judges that the license management unit 1a meets the search condition as a result of the search, the license management unit 2a requests the license management unit 1a to transfer the license information, and presents the user ID "U1". Upon receiving the request of the license information, the license management unit 1a sends the reserved license information to the license management unit 2a because the presented user ID "U1" matches the user ID "U1" included in the reservation information. Upon acquiring the license information, the license management unit 2a further sends the license information to the content output unit 2b, and then, the content output unit 2b reproduce the movie content using the license information.

Also, a plurality of function units or users may reserve acquisition of identical license information. In this case, the above reservation information includes a plurality of function IDs or user IDs.

Furthermore, priorities for using license information may be assigned to a plurality of function units or users that reserve acquisition of identical license information. More specifically, priorities are assigned to respective function IDs or user IDs included in the reserved information.

In this case, even if a plurality of function units reserve the identical license information, the highest-priority function unit can only acquire the license information to use it. Further, if the highest-priority function unit cancels the reservation, the second highest-priority function unit can only acquire the license information to use it.

Furthermore, in the above case, each license management unit that holds the license information subject to reservation holds the license information along with the reservation information, but one license management unit may hold the reservation information collectively, or a new management terminal device that holds and manages the reservation information collectively may be provided.

Also, in the present embodiment and the variations thereof, the content output unit that has requested the license information acquires it, but other content output units may acquire the license information.

In this case, when the content usage device 1 is located on the first floor of a house and the content usage device 2 is located on the second floor, for example, a user has the content output unit 1b request license information by operating the content usage device 1 on the first floor, and then has the content output unit 2b of the content usage device 2 on the second floor acquire the license information. As a result, the usability of the home network 300 can be improved.

The content usage device according to the present invention is suitable for use of a plurality of them being connected to one another via a communication network at home, etc., as STB, PC or PDA that outputs videos, sounds, etc. or recording data using a content distributed from a server.

The invention claimed is:

1. A content usage device connected to (i) a server that is located outside a defined network in which a gateway apparatus is located and (ii) a plurality of other content usage devices within the defined network, each of the other content usage devices being for using content, and each of the other content usage devices and the content usage device being connected, from within the defined network, to the gateway apparatus that provides a connection to the server located outside the defined network, the server storing license information of a content, the content usage device comprising:

a license management device configured to manage the license information of the content, the license information of the content enabling usage of the content; and an output device configured to output the content in compliance with the license information of the content, wherein the license management device of the content usage device receives a request for the license information of the content from the output device, wherein, upon receipt of the request for the license information from the output device and when the license management device of the content usage device does not contain the license information requested by the output device, the license management device of the content usage device (i) searches, from within the defined network, for and identifies a first content device of the plurality of other content usage devices that includes a license management device containing the license information of the content requested by the output device, (ii) requests, from within the defined network, the license management device of the identified first content usage device to transfer the license information of the content to the content usage device, (iii) receives, from the identified first content usage device having the license information of the content and being within the defined network, the license information of the content without receiving the license information of the content from the server, the license information of the content being received by the identified first content usage device from the server via the gateway apparatus, and (iv) passes the received license information of the content to the output device, and wherein the output device outputs the content in compliance with the license information passed from the license management device of the content usage device.

2. The content usage device according to claim 1, wherein the license management device of the content usage device, upon receiving a request for license information of the content from a license management device of a second content usage device of the plurality of other content usage devices, authenticates the second content usage device that transmitted the request for the license information of the content, and wherein, when the license management device of the content usage device judges that the second content usage device is unauthorized, the license management device of the content usage device prohibits the second content usage device from receiving the license information from the content usage device.

3. The content usage device according to claim 2, wherein the license management device authenticates the second content usage device that transmitted the request for the license information to the content usage device by determining whether or not the second content usage device belongs to a user domain that (i) is set as a movable range of the license information of the content and (ii) the content usage device belongs to.

4. The content usage device according to claim 3, wherein each of the plurality of other content usage devices is identified by respective identification information, wherein the license management device of the content usage device stores a domain list, the domain list registering predetermined identification information identifying a content usage device of the plurality of other content usage devices that is permitted to move the license information of the content from the content usage device, and wherein the license management device of the content usage device refers to the domain list, and determines that the second content usage device belongs to the user domain when the identification information identifying the second content usage device is registered in the domain list.

5. The content usage device according to claim 3, wherein the license management device of the content usage device determines whether or not the second content usage device belongs to the user domain to which the content usage device belongs, and wherein the license management device of the content usage device authenticates the second content usage device by determining whether or not the second content usage device is permitted to receive the license information of the content from the content usage device under a predetermined usage restriction, the predetermined usage restriction restricting a content usage device, of the plurality of other content usage devices that belong to the user domain, that is permitted to receive the license information of the content from the content usage device.

6. The content usage device according to claim 1, wherein the license management device of the content usage device (i) broadcasts, to the plurality of other content usage devices, an inquiry for inquiring whether or not the license information of the content is contained therein, and (ii) searches for license management devices of the other content usage devices that contain the license information of the content based on a response to the inquiry.

7. The content usage device according to claim 1, wherein the license management device of the content usage device, upon receiving a request for license information from a license management device of a second content usage device of the plurality of other content usage devices, searches for the license information of the content requested by the second content usage device from among license information contained therein, and wherein, when the license management device of the content usage device does not contain the license information requested by the second content usage device, the license management device of the content usage device requests a third content usage device of the plurality of other content usage devices to search for the license information requested by the second content usage device, and wherein, when the third content usage device does not contain the requested license information requested by the second content usage device, the third content usage device requests a fourth content usage device of the plurality of content usage devices to search for the requested license information.

8. The content usage device according to claim 1, wherein the license management device of the content usage device, upon receiving a reservation for a request for the license information from the output device, reserves the license management device of the first content usage device for receiving the license information to secure the license information contained in the license management device of the first content usage device from being released.

9. A content usage device connected to (i) a server that is located outside a defined network in which a gateway apparatus is located and (ii) a plurality of other content usage devices within the defined network, each of the other content usage devices being for using content, and each of the other content usage devices and the content usage device being connected, from within the defined network, to the gateway apparatus that provides a connection to the server located outside the defined network, the server storing license information of a content, the content usage device comprising:

a license management device configured to manage the license information of the content, the license information of the content enabling usage of the content; and an output device configured to output the content in compliance with the license information of the content, wherein the license management device of the content usage device receives a request for the license information of the content from the output device, wherein, upon the license management device of the content usage device receiving the request for the license information from the output device and when the license management device of the content usage device does not contain the license information requested by the output device receipt of the request for the license information from the output device, the output device (i) searches, from within the defined network, for and identifies a first content device of the plurality of other content usage devices that contains the license information of the content requested by the output device, (ii) requests, from within the defined network, the identified first content usage device to transfer the license information of the content to the content usage device, (iii) receives, from the identified first content usage device the license information of the content and being within the defined network, the license information of the content without receiving the license information of the content from the server, the license information of the content being received by the identified first content usage device from the server via the gateway apparatus, and (iv) outputs the content in compliance with the received license information.

10. A network system comprising a first content usage device and a second content usage device, wherein the first content usage device and the second content usage device are connected, from within a defined network of the network system, to a server that is located outside the defined network of the network system in which the gateway apparatus is located, the first and the second content usage devices being connected, from within the defined network, to the gateway apparatus that provides a connection to the server located outside the defined network, wherein the first content usage device is connected to the second content usage device within the defined network, wherein the server stores license information of a content, wherein the first content usage device includes:

a license management device configured to manage the license information of the content, the license information of the content enabling usage of the content; and an output device configured to output the content in compliance with the license information of the content, wherein the second content usage device includes a license management device configured to manage the license information of the content, the license information of the content being received from the server, wherein the license management device of the first content usage device receives a request for the license information of the content from the output device, and wherein, upon receipt of the request for the license information from the output device and when the license management device of the first content usage device does not contain the license information of the content, (i) the license management device of the first content usage device searches, from within the defined network, for and identifies the second content device that includes the license management device containing the license information of the content, (ii) the output device of first content usage device requests the identified second content usage device to transfer the license information of the content to the first content usage device, (iii) the license management device of the identified second content usage device receives the request to transfer the license information from the output device of the first content usage device, (iv) the first content usage device receives, from the identified second content usage device, the license information of the content without receiving the license information of the content from the server via the gateway, and (v) the first content usage device outputs the content in compliance with the license information received from the identified second content usage device.

11. The content usage device according to claim 1, wherein the first content usage device contains the license information of the content, and the first content usage device receives the license information of the content from the server via the gateway apparatus.

12. The content usage device according to claim 1, wherein the first content usage device contains the license information of the content, the first content usage device receives the license information of the content from a second content usage device of the plurality of content usage devices located within the defined network, and the second content usage device receives the license information of the content from the server via the gateway apparatus.

13. A method for receiving license information of a content by a content usage device, the content usage device being connected to (i) a server that is located outside a defined network in which a gateway apparatus is located and (ii) a plurality of other content usage devices within the defined network, each of the other content usage devices being for using content, and each of the other content usage devices and the content usage device being connected, from within the defined network, to the gateway apparatus that provides a connection to the server located outside the defined network, the server storing the license information of the content, the method comprising:

searching, using the content usage device and from within the defined network, for and identifying a first content device of the plurality of other content usage devices that includes a license management device containing the license information of the content;

requesting the license management device of the identified first content usage device to transfer the license information of the content to the content usage device;

in response to the license management device of the identified first content usage device receiving the request to transfer the license information to the content usage device the content usage device receiving, from the identified first content usage device having the license information of the content, the license information of the content without receiving the license information of the content from the server, the license information of the content being received by the identified first content usage device from the server via the gateway apparatus; and outputting, from the content usage device, the content in compliance with the license information received from the identified first content usage device.

* * * * *